(12) United States Patent
Eastin et al.

(10) Patent No.: US 11,229,876 B1
(45) Date of Patent: Jan. 25, 2022

(54) SYSTEMS FOR THE CONTROL AND USE OF FLUIDS AND PARTICLES IN FUEL APPLICATIONS INCLUDING BOILERS, REFINERY AND CHEMICAL FLUID HEATERS, ROTARY KILNS, GLASS MELTERS, SOLID DRYERS, DRYING OVENS, ORGANIC FUME INCINERATORS, AND SCRUBBERS

(71) Applicant: Kamterter Products, LLC, Waverly, NE (US)

(72) Inventors: John Alvin Eastin, Waverly, NE (US); David Vu, Waverly, NE (US)

(73) Assignee: KAMTERTER PRODUCTS, LLC, Waverly, NE (US)

( * ) Notice: Subject to any disclaimer, the term of this patent is extended or adjusted under 35 U.S.C. 154(b) by 77 days.

(21) Appl. No.: 16/152,193

(22) Filed: Oct. 4, 2018

Related U.S. Application Data

(60) Provisional application No. 62/567,868, filed on Oct. 4, 2017.

(51) Int. Cl.
  *B01D 53/18* (2006.01)
  *B01D 47/06* (2006.01)
  (Continued)

(52) U.S. Cl.
  CPC ............. *B01D 53/18* (2013.01); *B01D 46/02* (2013.01); *B01D 47/00* (2013.01); *B01D 47/06* (2013.01);
  (Continued)

(58) Field of Classification Search
  CPC ........ B01D 46/02; B01D 47/06; B01D 47/16; B01D 53/504; B01D 53/505;
  (Continued)

(56) References Cited

U.S. PATENT DOCUMENTS 2,737,314 A   3/1956 Anderson
3,695,004 A * 10/1972 DeLisio ................. B01D 47/06
                                                                96/251
(Continued)

OTHER PUBLICATIONS

EFSA Panel on Biological Hazards (BIOHAZ). (2010). Scientific opinion on fish oil for human consumption. Food hygiene, including rancidity. EFSA Journal, 8(10), 1874. (Year: 2010).*

(Continued)

*Primary Examiner* — Jonathan Miller
*Assistant Examiner* — Gabriel E Gitman
(74) *Attorney, Agent, or Firm* — Suiter Swantz pc llo

(57) ABSTRACT

Delivery mechanisms and distribution mechanisms are varied, adjusted, or modified based on a desired fuel application. Dimensions, flow rates, pressures, viscosities, temperatures, friction parameters, and combinations thereof may be varied, adjusted or modified. The fuel application may include a scrubber application. The scrubber application uses a delivery mechanism to deliver a wet or dry scrubbing agent at a low pressure to a distribution mechanism. The distribution mechanism distributes the scrubbing agent within the scrubbing chamber. The delivery mechanism is adjustable based on properties of a feedstock utilized to deliver the scrubbing agent, properties of a propellant, or properties of the scrubbing application. The distribution mechanism is adjustable based on desired distribution characteristics including shape, size, or velocity of drops, mists, or particles distributed. Location, processes, and by-products associated with output of the scrubbing application may be based on a stage of the scrubbing application.

19 Claims, 18 Drawing Sheets

(51) Int. Cl.
*B05B 7/00* (2006.01)
*F23D 1/00* (2006.01)
*B01D 47/16* (2006.01)
*B01D 46/02* (2006.01)
*B01D 47/00* (2006.01)
*B01D 53/14* (2006.01)
*B01D 53/34* (2006.01)
*B01D 53/83* (2006.01)
*F23J 15/00* (2006.01)
*B01D 53/50* (2006.01)
*A01C 7/04* (2006.01)
*A01C 7/08* (2006.01)
*B01D 53/48* (2006.01)

(52) U.S. Cl.
CPC .......... *B01D 47/16* (2013.01); *F23D 1/005* (2013.01); *A01C 7/042* (2013.01); *A01C 7/084* (2013.01); *B01D 53/14* (2013.01); *B01D 53/1487* (2013.01); *B01D 53/1493* (2013.01); *B01D 53/34* (2013.01); *B01D 53/48* (2013.01); *B01D 53/504* (2013.01); *B01D 53/505* (2013.01); *B01D 53/83* (2013.01); *B01D 2258/0283* (2013.01); *B01D 2279/30* (2013.01); *B05B 7/00* (2013.01); *F23D 2201/20* (2013.01); *F23D 2208/00* (2013.01); *F23J 15/003* (2013.01); *F23J 2219/40* (2013.01); *F23N 2235/28* (2020.01); *F23N 2235/30* (2020.01)

(58) Field of Classification Search
CPC .......... B01D 2258/0283; B01D 53/14; B01D 53/34; B01D 53/83; B01D 2279/30; B01D 53/1487; B01D 53/1493; B01D 47/00; B01D 53/18; B01D 53/48; B05B 7/00; A01C 7/042; A01C 7/084; F23D 1/005; F23D 2201/20; F23D 2208/00; F23J 2219/40; F23N 2235/28; F23N 2235/30; B65G 33/18
See application file for complete search history.

(56) References Cited

U.S. PATENT DOCUMENTS

| | | | | |
|---|---|---|---|---|
| 3,846,529 A | | 11/1974 | Poteet, III | |
| 3,963,461 A | * | 6/1976 | Stockford | B01D 47/00 95/10 |
| 4,238,461 A | * | 12/1980 | Devries | B01D 53/34 423/210 |
| 4,275,808 A | * | 6/1981 | Bullivant | B65G 47/19 198/533 |
| 4,375,455 A | * | 3/1983 | Teller | B01D 50/00 423/210 |
| 4,552,732 A | * | 11/1985 | Hillekamp | B01D 53/34 423/210 |
| 4,682,991 A | * | 7/1987 | Grethe | B01D 47/06 261/78.2 |
| 4,756,892 A | * | 7/1988 | Kragh | B01D 53/34 159/4.02 |
| 4,844,721 A | * | 7/1989 | Cox | B01D 53/1493 95/154 |
| 6,464,952 B1 | * | 10/2002 | Schwab | B01D 53/504 261/115 |
| 8,128,737 B2 | * | 3/2012 | Lomax, Jr. | B01D 53/1493 95/159 |
| 9,148,994 B1 | * | 10/2015 | Eastin | A01C 7/004 |
| 2003/0056648 A1 | * | 3/2003 | Fornai | B01D 47/06 95/65 |
| 2009/0271039 A1 | * | 10/2009 | Richman | F23J 15/02 700/274 |
| 2012/0235086 A1 | * | 9/2012 | Schlicht | B01J 20/28004 252/184 |
| 2013/0068852 A1 | * | 3/2013 | Wurz | B01F 5/0405 239/8 |
| 2013/0294987 A1 | * | 11/2013 | Smyrniotis | B01D 53/79 423/210 |
| 2017/0182459 A1 | * | 6/2017 | Klidas | F23J 15/04 |
| 2017/0333830 A1 | * | 11/2017 | Wei | B01D 53/1456 |

OTHER PUBLICATIONS

Marvin, R. S. (1971). The accuracy of measurements of viscosity of liquids. J Res Natl Bur Stand Sect A, 75(6), 535-540. (Year: 1971).*

EFSA Panel on Biological Hazards, 2010, Scientific opinion on fish oil for human consumption. Food hygiene, including rancidity. EFSA Journal, 8(10), 1874. (Year: 2010).*

Marvin, 1971, The accuracy of measurements of viscosity of liquids. J Res Natl Bur Stand Sect A, 75(6), 535-540. (Year: 1971).*

* cited by examiner

1500

Determine scrubbing application from one or more of: Venturi, orifice, fiber-bed, spray nozzle, impingement-plate, and mechanical scrubbing.

Determine one or more characteristics of the feedstock material, including determining a characteristic of a medium- to high-viscosity fluid (e.g., slurry) or a fine particulate feed (e.g., pulverized lime).

Determine characteristic of a process gas (e.g., process air).

Select propellant, and/or feedstock based on characteristics of process gas and/or characteristics of feedstock material.

Determine a combined characteristic resulting from the combination of 1) feedstock material and propellant, or 2) feedstock material, propellant, and process gas.

Select delivery and/or distribution mechanism.

Perform Scrubbing application.

1602 — Scrubbing a process air flow using spray nozzles that deliver a medium to high viscosity fluid at a low pressure.

1604 — Draining the medium to high viscosity fluid from a scrubbing chamber and collecting the medium to high viscosity fluid.

1606 — Distribute the collected medium to high viscosity fluid and pollutants to soil to be used as a fertilizer for one or more types of plants.

1608 — Restricting application of collected fluids to plants intended for ethanol fuel production.

1610 — Using plants treated with collected fluids in ethanol fuel and/or animal feed production process.

FIG. 16

SYSTEMS FOR THE CONTROL AND USE OF FLUIDS AND PARTICLES IN FUEL APPLICATIONS INCLUDING BOILERS, REFINERY AND CHEMICAL FLUID HEATERS, ROTARY KILNS, GLASS MELTERS, SOLID DRYERS, DRYING OVENS, ORGANIC FUME INCINERATORS, AND SCRUBBERS

PRIORITY

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a nonprovisional application of provisional patent application Ser. No. 62/567,868 entitled SYSTEMS FOR THE CONTROL AND USE OF FLUIDS AND PARTICLES IN FUEL APPLICATIONS INCLUDING BOILERS, REFINERY AND CHEMICAL FLUID HEATERS, ROTARY KILNS, GLASS MELTERS, SOLID DRYERS, DRYING OVENS, ORGANIC FUME INCINERATORS, AND SCRUBBERS, naming John Alvin Eastin and David Vu as inventor, filed Oct. 4, 2017.

TECHNICAL FIELD

The present invention generally relates to combustion technology, and, in particular, boilers, refinery and chemical fluid heaters, rotary kilns, glass melters, solid dryers, drying ovens, organic fume incinerators, and scrubbers.

BACKGROUND

Thermal fluid systems and boilers in the combustion industry are generally recognized as closed vessels containing a heated fluid, thermal energy from the fluid is transferred to heat sink for a beneficial purpose (e.g., indoor temperature control, process temperature control, etc.). In order to heat the fluid, boilers often utilize a furnace or other combustion apparatus that utilizes a spray nozzle to deliver fuel to a combustion chamber. Current spray nozzles and/or delivery and distribution means employed in thermal fluid systems and boilers are inefficient or otherwise need improvement.

Furnaces, kilns, drying ovens, dryers, glass melters, and refinery combustors are often heated and/or pre-heated by burners (e.g., oxy-fuel combustion burners) that utilize a spray nozzle or a burner configuration that is limited in receivable fuel type, air/fuel mixing, inefficient delivery means, or combinations thereof. Most combustion applications result in toxic emissions, airborne breathable particulates, and other pollutants. Reducing such toxic emissions, particulates, and pollutants is an ever-present focus of industry standards and regulations.

Scrubbers are used throughout industry. There are both wet scrubbers and dry scrubbers. Air scrubbers can be a wet or a dry scrubber and are commonly used to remove pollutants and/or dust from industrial exhaust before it is emitted into the environment. Wet air scrubbers typically utilize a water source to spray and mix droplets of water with the exhaust to cleanse it of harmful particulates before emission into the environment. For example, Venturi scrubbers, orifice scrubbers, fiber-bed scrubbers, spray nozzle scrubbers, impingement-plate scrubbers, and mechanical scrubbers are all commonly utilized.

A problem with using water as the wetting agent in scrubbers is waste-water disposal processes. Such processes often result industrial sludge that is not desirable or beneficial to ecosystems.

Further, some contaminants or pollutants have lipophilic properties and are not readily extracted from process air using a water-sourced scrubber.

Further, in many dry scrubbers the delivery mechanism can be inefficient, relying on high pressures for injecting the dry scrubbing agent.

Therefore, improved apparatuses and methods for fuel- and combustion-related applications are needed.

SUMMARY

Apparatuses and methods for fuel delivery and distribution are disclosed. In one aspect, an apparatus includes one or more fuel inlets and one or more propellant inlets. The apparatus includes a spray outlet, where the spray outlet is in communication with one or more adjustable components of a fixture to adjust spray outlet parameters. In one aspect, the spray outlet parameters are adjusted based on fuel characteristics. In another aspect the parameters are adjusted based on propellant characteristics. In another aspect the parameters are adjusted based on combined fuel and propellant characteristics.

Apparatuses and methods for fuel applications in which delivery means and/or distribution means are tailored to the specific fuel application are disclosed. Dimensions of the distribution means including spray fixtures are adjusted based on feedstock characteristics, propellant characteristics, or combinations thereof. Dimensions of the delivery means including pressure, flow rates, tube/pipe diameters, friction coefficients, temperature (e.g., pre-heat temperature), and combinations thereof are adjusted based on feedstock characteristics, propellant characteristics, or combinations thereof.

Apparatuses and methods for scrubbing are disclosed. In one aspect, the apparatus includes a process gas inlet, an exhaust outlet, a scrubbing agent and a collector. A by-product of the scrubbing process may be used in one or more dedicated processes.

In another aspect, the method includes scrubbing a process air flow using a delivery mechanism and a distribution mechanism as disclosed herein. The method may further include collecting the scrubbing agent and a pollutant from one or more scrubbing processes. The method may further include distributing the collected fluids according to a dedicated process. The delivery mechanism and/or the distribution mechanism may vary or adjust according to the dedicated process.

BRIEF DESCRIPTION OF THE DRAWINGS

The numerous advantages of the disclosure may be better understood by those skilled in the art by reference to the accompanying figures in which:

FIG. 15 shows a flow diagram of a scrubbing method, in accordance with one or more embodiments of the present disclosure;

FIG. 16 shows a flow diagram of a scrubbing and fertilizing method, in accordance with one or more embodiments of the present disclosure;

DETAILED DISCLOSURE

Figure 1:
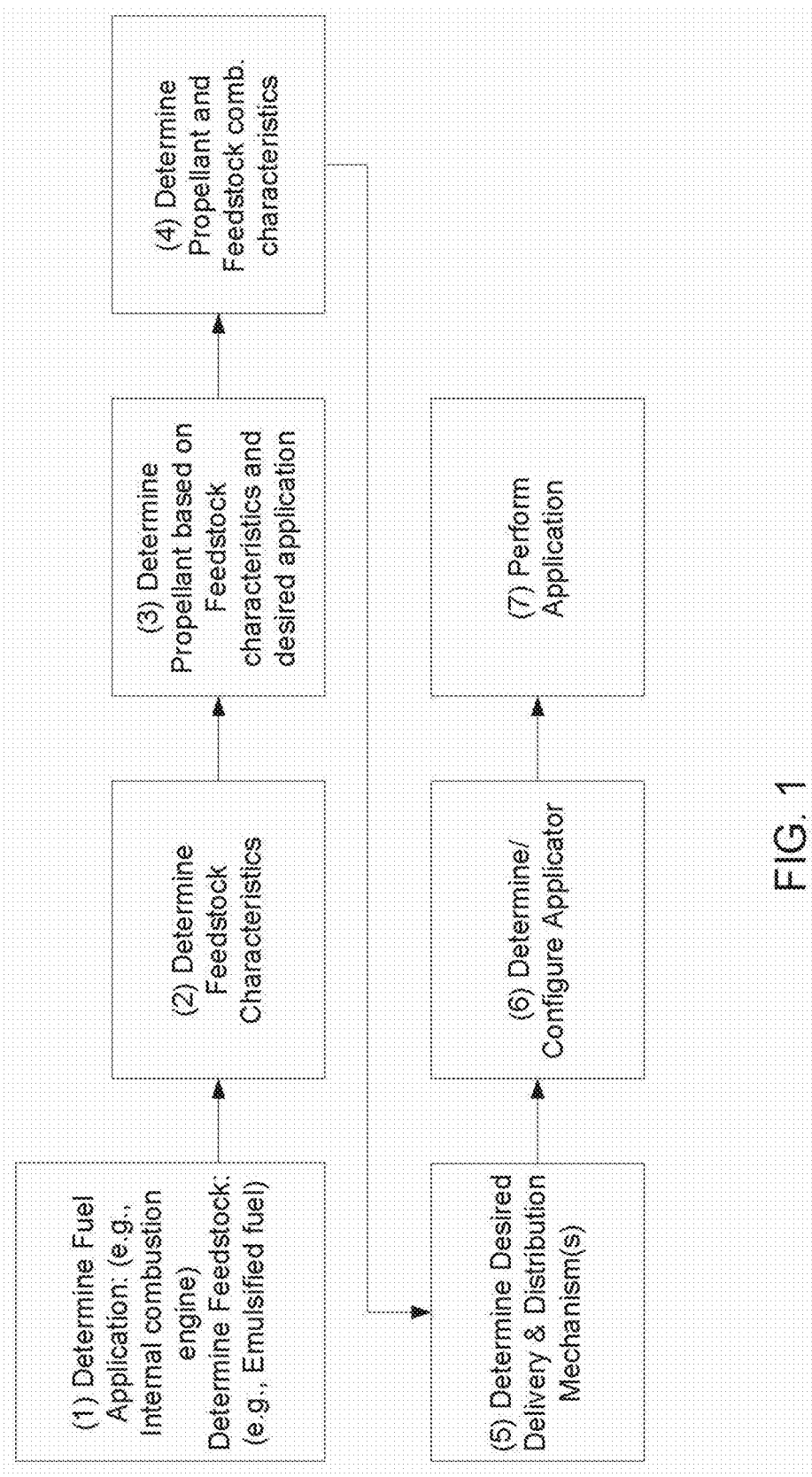
FIG. 1 shows a flow diagram of a feedstock delivery and distribution method, in accordance with one or more embodiments of the present disclosure.
Figure 2:
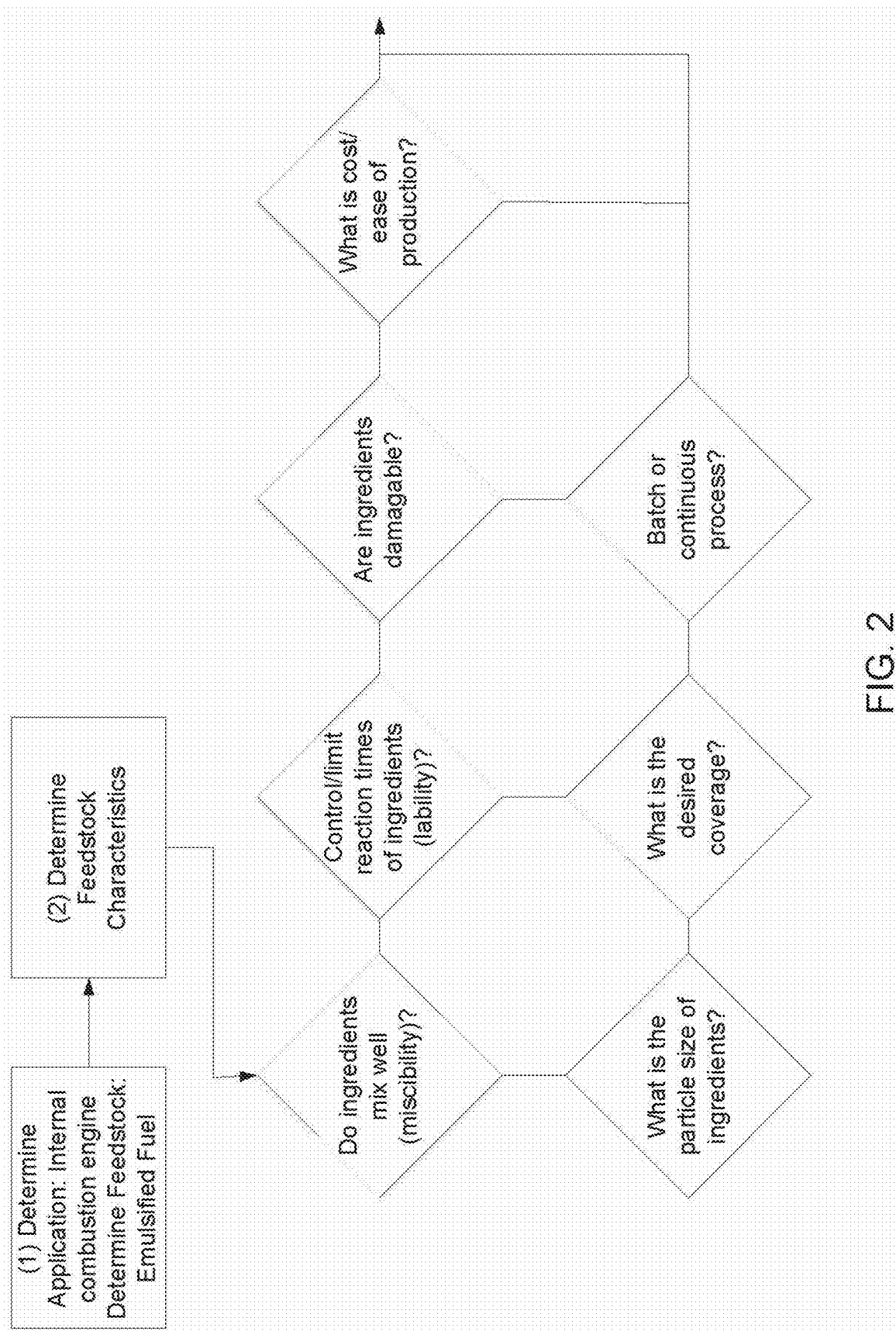
FIG. 2 shows a flow diagram for determining the feedstocks for delivery and distribution, corresponding to FIG. 1, in accordance with one or more embodiments of the present disclosure.
Figure 3:
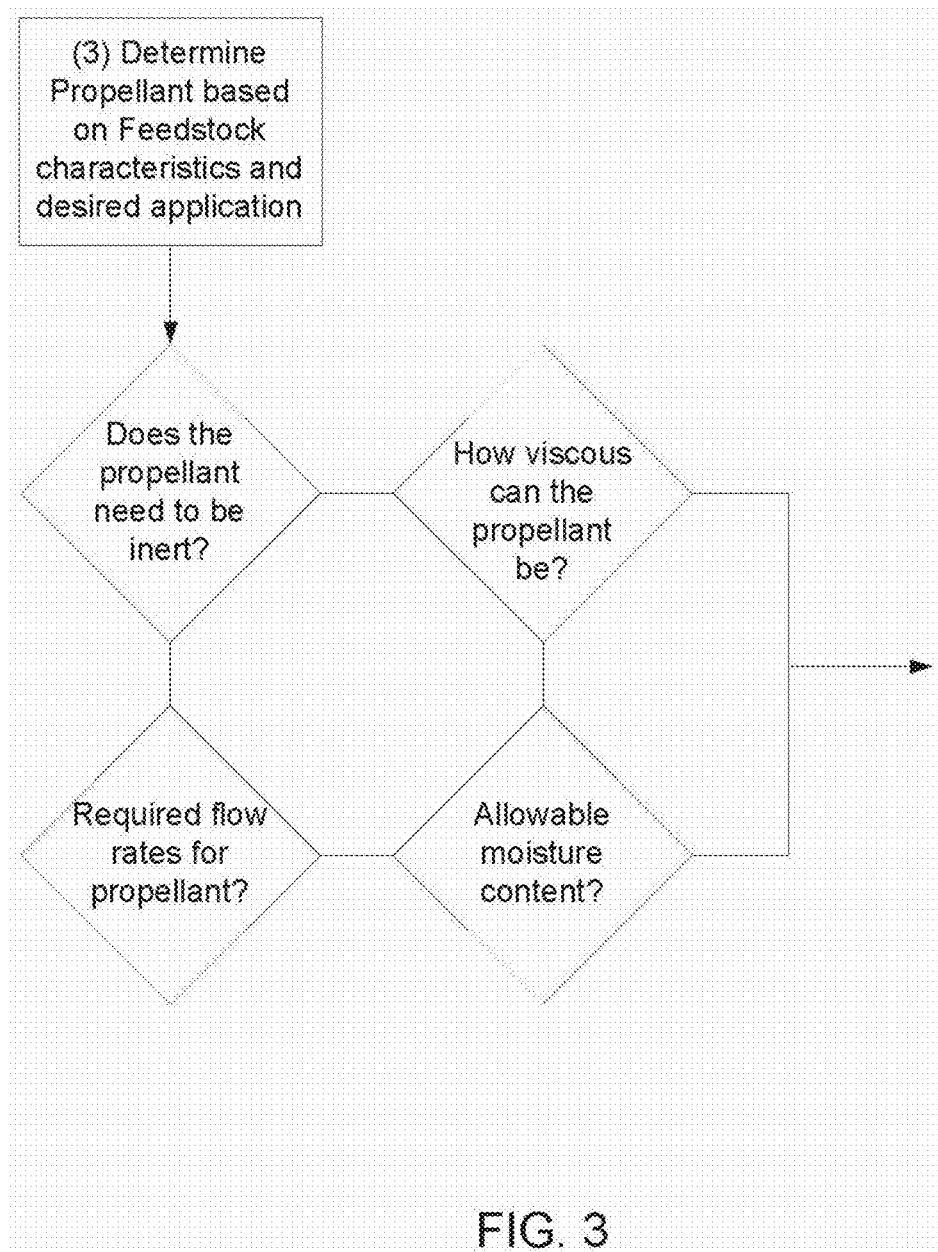
FIG. 3 shows a flow diagram for determining the propellant based on feedstock characteristics and desired application, corresponding to FIG. 1, in accordance with one or more embodiments of the present disclosure.
Figure 4:
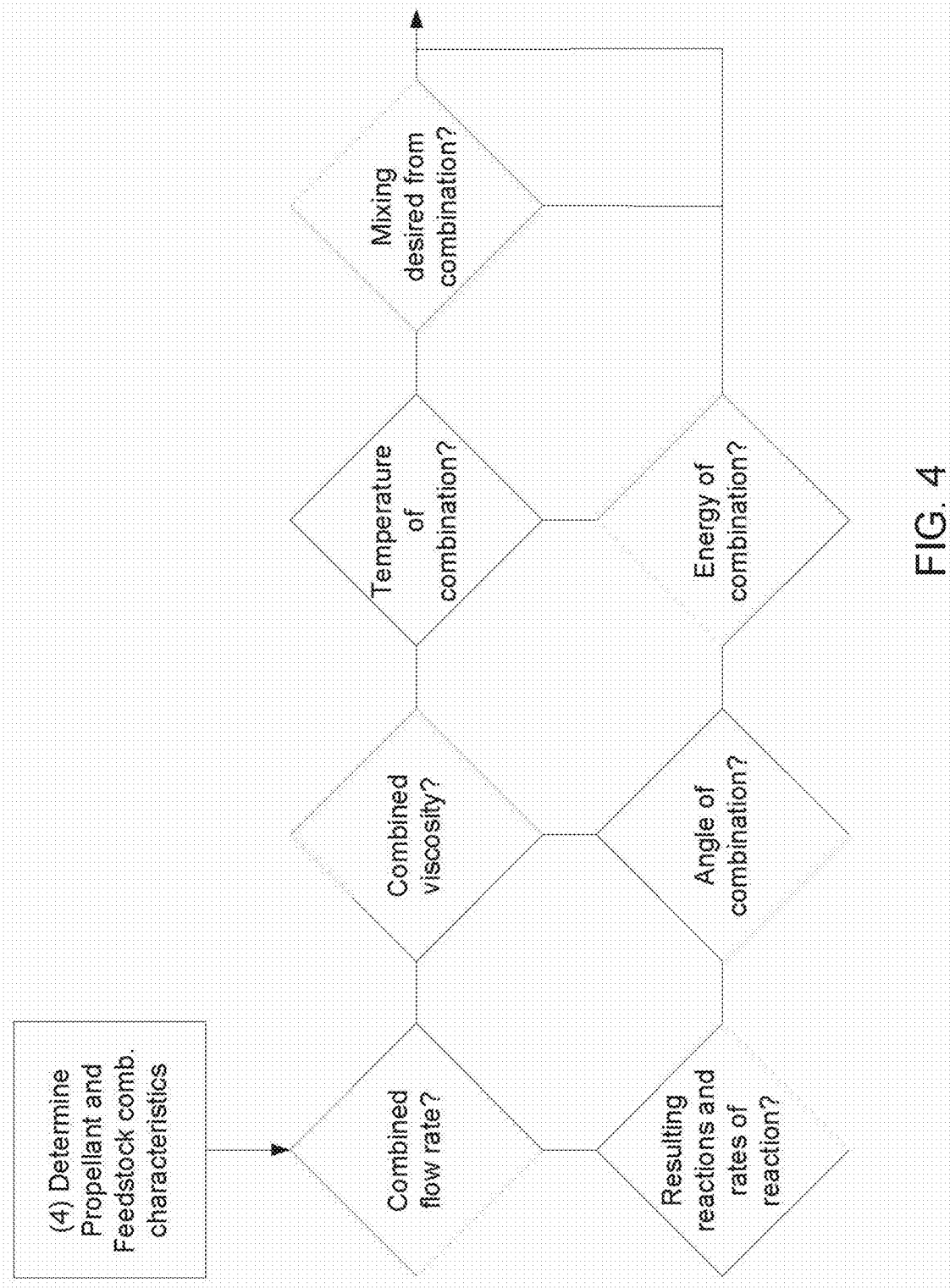
FIG. 4 shows a flow diagram for determining the combined characteristics of the propellant and propellant, corresponding to FIG. 1, in accordance with one or more embodiments of the present disclosure.
Figure 5:
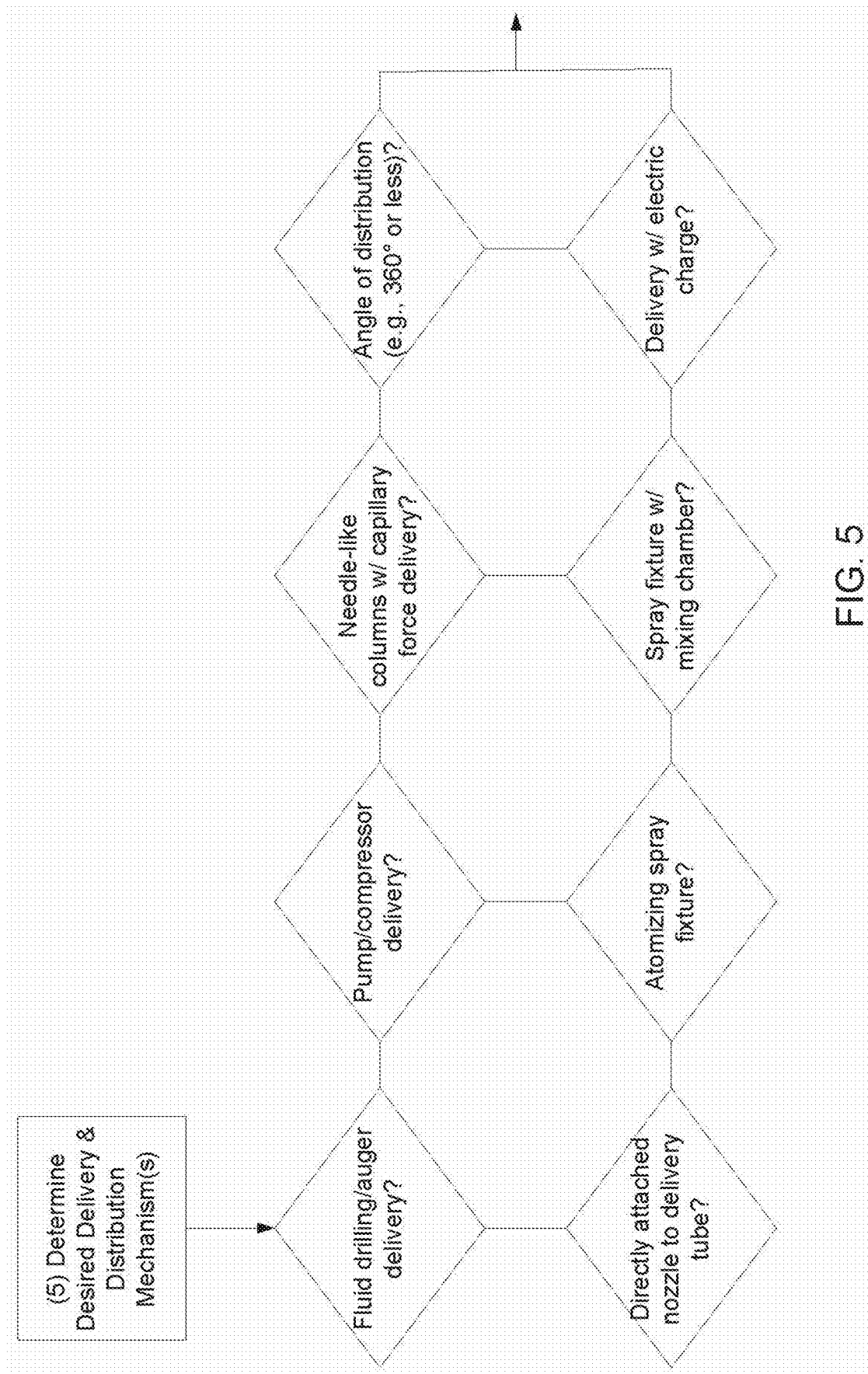
FIG. 5 shows a flow diagram for determining desired delivery and distribution mechanisms, corresponding to FIG. 1, in accordance with one or more embodiments of the present disclosure.
Figure 6:
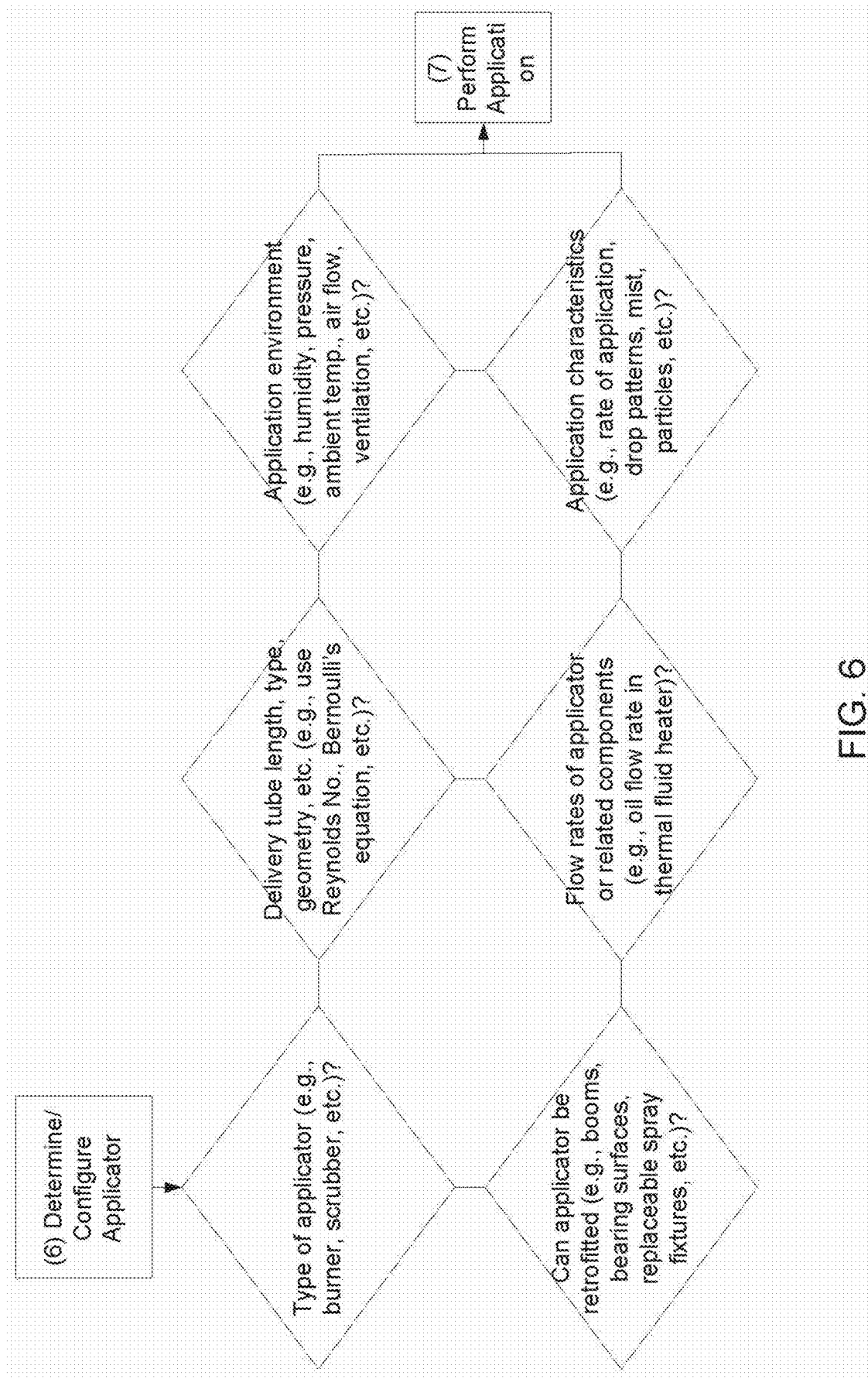
FIG. 6 shows a flow diagram for determining and configuring the applicator, corresponding to FIG. 1, in accordance with one or more embodiments of the present disclosure.
Figure 7:
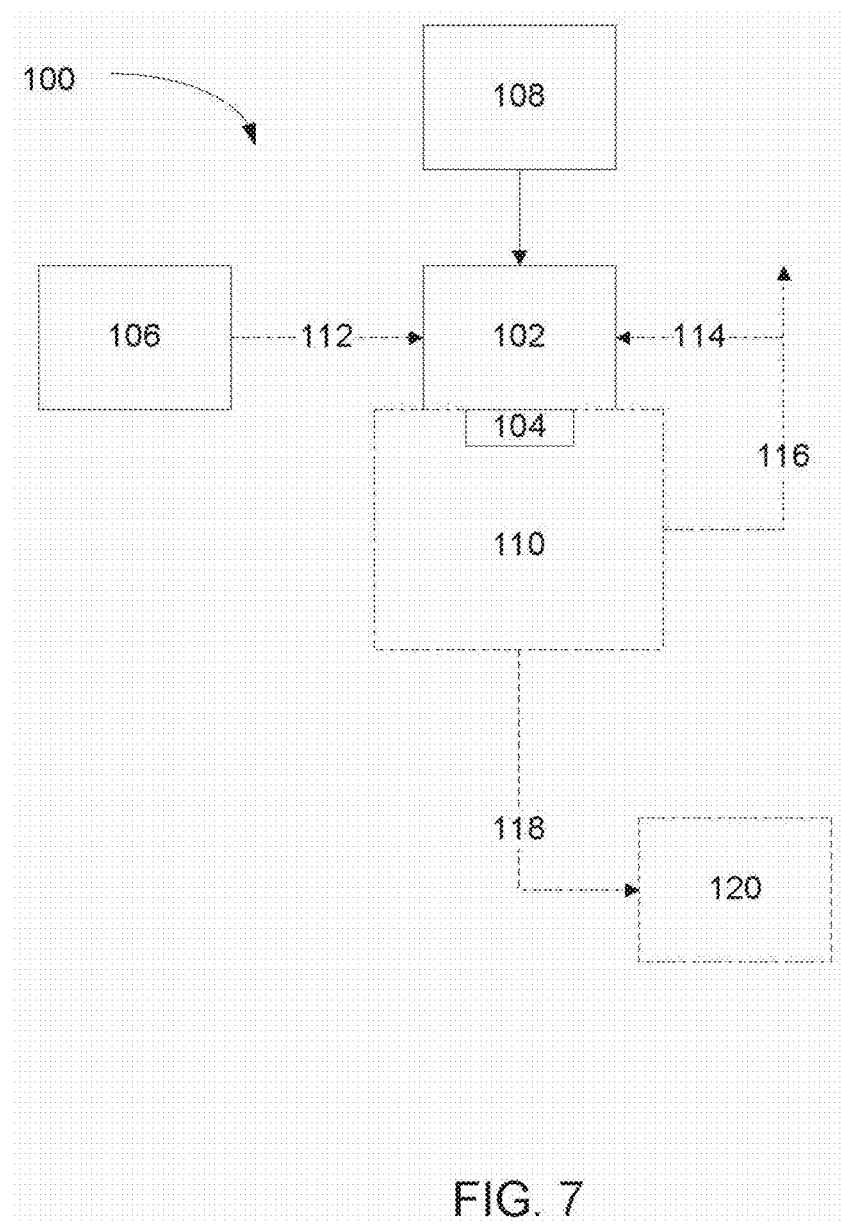
FIG. 7 shows a block diagram of a fuel system, in accordance with one or more embodiments of the present disclosure.

"Delivery mechanism" as used herein includes, but is not limited to, an auger within a delivery tube, multiple augers within a delivery chamber or a large delivery tube, a low pressure pump (e.g., peristaltic, gear, etc.), inlets and/or outlets, a fluid line, a valve, a hopper sized or angled for effective delivery, an electric charge, a needle-like column, adjustable opposing plates, a spray fixture, capillary forces, and combinations thereof.

"Distribution mechanism" as used herein includes, but is not limited to, a spray fixture, a nozzle, spray outlets, delivery tube outlets, a shearing knife, an opening between a plate of a fixture, and combinations thereof.

"Propellant" as used herein includes a low to medium viscosity fluid used to propel an oil, ingredient, fluid, particle, semi-solid, slurry, emulsion, colloidal suspension, or a combination thereof, out of a distribution mechanism. The propellant generally combines its kinetic energy with the kinetic energy of the material being propelled (e.g., utilizes mostly constructive forces as opposed to destructive forces). The propellant generally has a lower viscosity than the material it propels. However, in embodiments in which propelled ingredients are vaporized and/or atomized prior to being delivered, the propellant may have a higher or similar viscosity as compared to the material being propelled. The propellant is often air, but may include other low to medium viscosity fluids such as inert gases, carbon dioxide, or combinations thereof.

"Feedstock material" as used herein includes, but is not limited to, any oils, ingredients, fluids, particles, semi-solids, slurries, emulsions, colloidal suspensions, or combinations thereof, delivered via a delivery mechanism disclosed herein to a distribution mechanism. The feedstock material generally has a high viscosity, such as a non-Newtonian fluid. The feedstock generally has a higher viscosity than the propellant. However, it is noted that in some applications, feedstock ingredients may be vaporized prior to mixing, and in such cases, the feedstock may have a lower or similar viscosity as compared to the propellant.

"Distributing" as used herein shall mean any form of moving, collecting, spraying or otherwise disposing of groups, patterns, or individual distributed forms of at least one of the following: fluid flow, drop, slurry, globule, fiber, particle, vapor, and mist.

"Spray fixture" or "nozzle" as used herein shall mean an apparatus adapted to be connected to a source of feedstock material or fuel and to a force for powering or propelling the feedstock material or fuel through the apparatus, the apparatus including an outlet and structure for controlling the output of feedstock material from the outlet of the spray fixture. The spray fixture encompasses more structure than a nozzle, and therefore in embodiments a spray fixture encompasses a nozzle, but not vice-versa.

"Newtonian fluid" as used herein shall mean a fluid that obeys Newton's law of viscosity, represented as follows:

$$\tau = \mu \frac{dV}{dy}$$

or in other words, where the shear stress, $\tau$ (N/m$^2$), is linearly proportional to the velocity gradient $dV/dy$, and where $\mu$ is dynamic viscosity (N s/m$^2$), $dV$ is unit velocity (m/s), and $dy$ is unit distance between layers (m).

"Non-Newtonian fluid" as used herein shall mean fluids that contain suspended particles or dissolved molecules. This term may include, but is not limited to, Bingham fluids, pseudoplastic fluids, dilatant fluids, thixotropic fluids, and viscoelastic fluids. The term shall include, but is not limited to, fluids whose characteristics are represented by the Ostwald-de Waele equation as follows:

$$\tau = K\left(\frac{dV}{dy}\right)^m$$

where K (often in $kg/ms^{2-n}$) and n (dimensionless) are constants determined by experimental fitting data. Generally, for pseudoplastic fluids, n is less than 1 and for dilatant fluids n is greater than 1.

"Labile" as used herein shall mean ingredients, components, particles, and/or fluids that are susceptible to changing state or losing a characteristic after prolonged contact with another ingredient, component, particle, and/or fluid. For example, an aromatic hydrocarbon is a labile ingredient that loses a liquid characteristic when subjected to air or fairly low temperatures.

"Combustion application" as used herein shall mean any application and/or technique utilized in a process related to or associated with a rapid oxidation generating thermal energy, light, or both. The term also encompasses slow oxidation in which little or no light and little thermal energy is generated.

"Scrubber application" as used herein shall mean any application and/or technique utilized in a process related to or associated with at least one of the following: Venturi scrubbers, orifice scrubbers, fiber-bed scrubbers, spray nozzle scrubbers, impingement-plate scrubbers, and mechanical scrubbers.

"Fuel application" as used herein shall mean any application and/or technique utilized in a process related to or associated with a spray fixture, a combustion application, a scrubber application, or combinations thereof.

"Viscosity" as used herein shall mean dynamic viscosity measured at room temperature (e.g., 20° C.) unless specifically specified otherwise.

"High viscosity" or "highly viscous fluids" as used herein includes fluids having a viscosity within the range of 0.8 to 10 kg/m·s (800 to 10,000 cP), inclusive. In some embodiments, the high viscosity fluids may be higher than 10 kg/m·s. Examples of fluids having high viscosity include dispersions, suspensions, or emulsions (e.g., oil emulsions). For instance, glycerol having an apparent viscosity of 1.412 kg/m·s (1412 cP) may be considered a high viscosity fluid. Corresponding yield stress, t, will vary depending on the fluid, but generally ranges from 10-200 Pa.

"Medium viscosity" with respect to fluids, includes a fluid having a viscosity within the range of $0.86 \times 10^{-3}$ to 0.08 kg/m·s (0.86 to 80 cP), inclusive. Examples of fluids having medium viscosity include Menhaden fish oil (used in some liquid fertilizers). In some embodiments, a medium viscosity fluid is from 1 cP, inclusive, to 800 cP, exclusive.

"Low viscosity" with respect to fluids, includes a fluid having a viscosity within the range of $0.97 \times 10^{-5}$ to $2.28 \times 10^{-5}$ kg/m·s (0.0097 to 0.0228 cP). Examples of fluids having low viscosity include air, nitrogen, and Xenon. In some embodiments, a low viscosity fluid is from 0.0097 cP, inclusive, to 1 cP, exclusive.

"Emulsifying agent" as used herein includes a substance that has hydrophobic and hydrophilic properties, allowing dissolution of the substance in fatty or oily solutions and in aqueous solutions. The term shall encompass fertilizer related emulsifying agents, including but not limited to, polyoxyethylene esters of fatty acids, polyoxyethylene glycol esters of fatty acids, polyoxyethylene sorbitan esters of fatty acids, propylene glycol esters of fatty acids, alkyl aryl polyether alcohols, organic phosphate esters, salts of alkyl aryl sulfonates, salts of fatty alcohol sulfates, alkyl aryl polyether sulfonates, sarcosinate salts, protein condensates, fatty acid amines, fatty amine condensates, amine salts of sulfonic acids, esters of sodium sulfosuccinic acid, and combinations thereof.

"Encapsulation" as used herein includes a method/process for distributing (e.g., entrapping) a first fluid component (e.g., particulate, pollutant, etc.) within a second fluid component (e.g., high viscosity fluid, carrier, amphiphilic component, or combinations thereof). In embodiments, this delivery of the first component within a second component may delay emission of a volatile pollutant, partially isolate the first component, encircle a portion of the feedstock material including the first component within a coating or a shell, affect a reaction rate of the first component, and combinations thereof. For instance, a result of encapsulation may include improving a delayed release characteristic, delaying delivery and/or emission until the first component reaches an action or reaction site (e.g., roots of a certain type of plant), improving a preservation characteristic (e.g., by providing a barrier between the first component and one or more reactants), generating particles with a size of a few nanometers or millimeters, and combinations thereof.

"Amphiphile" as used herein means a molecule with both hydrophilic and hydrophobic properties.

"Wetting agent" as used herein means a fluid used to wet or change a density of particulates in process air or intended for process air. The term may also be used with respect to a compound, molecule, and/or fluid that affects a surface tension of a substance.

"Low Pressure" as used herein means pressure sufficiently low that the need of high powered compressors and high pressure delivery means are negated. For example, low pressures may be from 1-15 psi or 6.89 to 103.42 kPa, inclusive.

Low pressure delivery methods and apparatuses are disclosed herein.

In some embodiments, a shear plate or shear force, is used to separate and deliver portions of feedstock material to delivery tubes, spray fixtures, and/or application surfaces (e.g., orifices, filters, filter media, etc.).

In some embodiments, fixtures have two or more separate fluid flow paths and only combine the fluid flow paths just before delivery. In other embodiments, fixtures allow fluid flow paths to combine prior to and during delivery, effecting improved mixing and resulting in a sprayed emulsion. Fluid flow paths of fixtures are adjustable to affect fluid dynamics and emissive spray patterns.

In some embodiments, fixtures are configured for fluid atomization and vaporization for improved mixing of miscible or immiscible fluids. These fixtures generally have two or more fluid paths and atomization or vaporization occurs as fluids from each path is brought into contact with each other.

In some embodiments, fixtures are configured for delivery of dry scrubbing agents. These fixtures generally employ a delivery mechanism that incorporates one or more augers.

In some embodiments, fixtures can variably adjust fluid delivery, which accordingly adjusts associated Reynolds numbers.

In some embodiments, labile ingredients are mixed with precision to avoid degradation and/or emission. In other embodiments, immiscible liquids are mixed with precision for improved uniformity in droplet concentration or droplet application.

In some embodiments, high viscosity fluids are mixed with, or have suspended therein, solid particles to deliver suspensions and/or emulsions for a desired scrubbing application. In these embodiments, the feedstock physical and energy characteristics often resemble those of non-Newtonian fluids.

The apparatuses, methods, principles, and inventive concepts disclosed herein, are related to fuel applications, and shall be applicable to combustion industries, combustion reactors, emission apparatuses, scrubbing applications, and combinations thereof.

Methods and apparatuses related to fluid drilling, spray fixtures, nozzles, delivery mechanisms, distribution mechanisms, mixing and/or distributing immiscible ingredients, and combinations thereof, are described generally in U.S. Pat. No. 9,148,994, issued on Oct. 6, 2015, filed Nov. 12, 2012, by John Alvin Eastin, et al., which is incorporated herein by reference in its entirety.

In many of fuel techniques and/or applications, ingredients do not mix well together. In many of these techniques and/or applications, reaction times of ingredients must be limited to increase desired chemical reactivity (e.g., combustion). In many of these techniques and/or applications, ingredients should not be mixed by delivery mechanisms prior to a desired point (e.g., ignition point). In many of these techniques and/or applications effective delivery may be proportional to, or affected by, particle size (e.g., as with coal slurries). In many of these techniques and/or applications a batch or a continuous process is required for an effective fuel application (e.g., one-time use of an incinerator vs. continual use of an internal combustion engine). In most of these techniques and/or applications, it is desirable to reduce production costs associated with conventional feedstock delivery. In many of these techniques and/or applications, delivery mechanisms should not result in excessive clogging at inlets or outlets or require excessive pulsation and vibrations to minimize the clogging. Further, these delivery mechanisms should be easily adjustable to deliver variable, desirable drop sizes, forms, particles, mists, or spray emission patterns.

In general, the flow diagram of FIG. 1 depicts an overview of methods of the present disclosure. For example, step (1) may include determining an appropriate feedstock material for an appropriate fuel application including, but not limited to, boilers, refinery and chemical fluid heaters, heat exchangers, spray columns, super-critical fluid extraction columns, distillation columns, rotary kilns, glass melters, solid dryers, drying ovens, roto-louver dryers, vacuum drum dryers, organic fume incinerators, and scrubbers, or combinations thereof; step (2) may include, but is not limited to, determining particle size, reactivity, volatility, reaction constants, viscosity (dynamic and/or kinematic), feedstock type (e.g., Newtonian, non-Newtonian, etc.), flow type (e.g., laminar or turbulent), pre-heat temperatures, Sherwood number, one or more dimensionless numbers (e.g., drag coefficient, Nusselt Number, Schmidt Number, etc.), flash point, dew-point, bubble-point, density, lability, and/or combinations thereof; step (3) may include determining a propellant (e.g., air) based on the feedstock characteristics (e.g., if the feedstock is highly reactive, a relatively inert propellant, such as helium (He), argon (Ar), neon (Ne), krypton (Kr), xenon (Xe), radon (Rn), Nitrogen (N2), may be selected); step (4) may include determining the feedstock material and propellant combined characteristics including, but not limited to, rates of reaction, rates of separation, rates of dilution, rates of diffusion, rates of absorption, rates of adsorption, required purity levels, thermodynamic properties, phase equilibria and/or ratios (e.g., K-values), vapor pressure, entropy of reactions, heat transfer, fugacity or partial fugacities, respective dipole moments, rates of drying, leaching processes, reflux ratios (e.g., optimum reflux ratios), rates of pervaporation for azeotropic mixtures, mass balances, mole balances, lability, volatility, hydrophilic-lipophilic balance (HLB Number), immiscibility, viscosity, and/or combinations thereof; step (5) may include determining a delivery mechanism and a distribution mechanism based on the characteristics determined in steps (1)-(4) (e.g., determining dimensions of delivery mechanism/means, determining whether fluid drilling with an auger, low pressure pump, capillary forces, and/or combinations thereof is the delivery mechanism, and determining dimensions and/or what type of spray fixture and/or nozzle should be incorporated); step (6) may include determining and configuring an appropriate applicator or spray fixture to provide delivery characteristics (e.g., burner, spray vehicle, industrial combustor, multiple nozzle configuration, or combinations thereof), that is configured or capable of providing required flow rates, pressures, temperatures, bearing beams, bearing surfaces, kinetic energy and/or movement, and/or combinations thereof, which may be determined using appropriate relationships and/or functions (e.g., Navier-Stokes equation, Euler's equation, Bernoulli's equation, friction heating terms, Reynolds number(s), friction factor for turbulent and/or laminar flow, Newton's law, Fick's Second Law equation, Ostwald-de Waele equation, Wilson's Equation, the non-random two-liquid (NRTL) model, the universal quasichemical (UNIQUAC) model, the UNIQUAC functional-group activity coefficients (UNIFAC) method/model, the Predictive Soave-Redlich-Kwong (PSRK) model, an electrolyte solution model, a polymer solution model, the Kremser equation, a McCabe-Thiele model/diagram, stage efficiency or number of stage models, an O'Connell correlation, a Hunter-Nash equilibrium method, an Emister/Lockhart/Leggett correlation, pressure drop model, a Fenske-Underwood-Gilland (FUG) method, or combinations thereof); and step (7) includes performing the desired application (e.g., fuel delivery for combustion, viscous fluid delivery for scrubbing, spray column etc.).

It is noted that at least some the steps above are not performed sequentially, but may be done in different orders or overlapping with another step. For example, some determinations of delivery mechanisms may be based substantially on feedstock characteristics determined in step (2). For instance, a feedstock determined to have particles may enable a determination that an atomizing spray fixture is an inappropriate distribution mechanism. Nevertheless, if a feedstock is determined to be volatile or labile, then one may need to know the propellant or its characteristics before determining an appropriate delivery and/or distribution mechanism. For instance, if the feedstock is determined to be an emulsified fuel or an ingredient of such, and the propellant is determined to be air and/or water, then the characteristics of the propellant (e.g., moisture content) may be required before being able to determine the appropriate delivery mechanism and/or distribution mechanism. Further, if an auger is the determined delivery mechanism, this may affect the determination of a propellant. For instance if the auger may only obtain a specific range of flow rates for delivery, then a low viscosity propellant may be determined as necessary to provide a sufficient constructive flow rate in order to obtain the overall application flow rate.

Flow diagrams providing additional detail for steps and sub-steps of the flow diagram of FIG. 1 are provided in FIGS. 2-6.

Referring again to FIG. 1, in step (1), a fuel application is determined. For example, the fuel application determined may include an application and/or technique for an internal combustion engine. In the combustion industry, injectors or other distribution means may result in atomization, fuel/air mixing, and fuel distribution.

In step (2) of an exemplary embodiment of a method disclosed herein, one or more characteristics of the feedstock or a feedstock material/ingredient are determined. For example, the feedstock may include ingredients, components, or particles that are labile. Feedstock materials that are labile must be delivered and/or distributed with precision and care. For example, an emulsified fuel application may provide a better combustion reaction if it remains in a water/fuel emulsion (W/OEF) form until combustion. During the preparation of the W/OEF, a non-ionic emulsifier having a viscosity of about 200-300 mPa·s may need to be added (e.g., Span® 85 by Sigma-Aldrich) and mixed with care. By way of another example, a propellant (e.g., heated air or gas) may contain moisture, affecting the lability of the emulsion. If the propellant contains a high moisture content (e.g., 15-55 g/m3), then contact with the labile ingredient may need to be minimized, or the propellant should be heated and/or cooled (e.g., evaporation or condensation) prior to contact with the labile ingredient.

In an exemplary embodiment, a feedstock characteristic is determined including a determination that a feedstock material has a high viscosity or of a medium viscosity. For example, a kinematic viscosity (at approximately 20-25° C.) of an emulsified fuel may be from 2-4 $mm^2/s$, which may vary depending on water content of the emulsified fuel, and a dynamic viscosity of the emulsified fuel may be from 3 to 4 centipoise.

In some embodiments, the determination that a feedstock includes a high- or medium-viscosity fluid may include a determination that the feedstock should include an amphiphile. For example, the feedstock may be intended for a W/OEF or a water/diesel (W/D) combustion engine and as such may require the addition of a surfactant, emulsifier, and/or a wetting agent. In some embodiments, the surfactant includes, but is not limited to, a gemini (e.g., double tailed surfactants), a viscoelastic, or a non-migratory surfactant. For example, the surfactant may include 1,2-ethane bis (dimethyl alkyl (CnH2n+1) ammonium bromide), sorbitan monooleatepolyethylene glycol, polyoxyethylene, glycerides, polyglycerols, sorbitan glycosides, esters, acids, or combinations thereof. In some embodiments, the determination that a feedstock includes a high- or medium-viscosity fluid includes a determination that a feedstock includes or should include a glycoside.

In some embodiments, the amphiphile is anionic. In other embodiments, the amphiphile is cationic. For example, the amphiphile may include N,N"-didodecyl-N,N,N',N'-tetramethyl-1,4-butanediammonium dibromide (12-4-12), cetylpyridinium chloride (CPC), or a salt thereof. In other embodiments, the amphiphile is zwitterionic. For example, the amphiphile may include lecithin.

In some embodiments, the determination that a feedstock includes or should include a high- or medium-viscosity fluid includes a determination that a feedstock includes a glycerol soluble compound. For example, the feedstock may include ethers, low molecular weight alcohols, and combinations thereof.

In an exemplary embodiment, determining feedstock characteristics may include a determination that an ingredient of the feedstock does not mix well with another feedstock material/ingredient or with a propellant. For example, an emulsion may be termed a dispersion of two or more immiscible liquids in the presence of a stabilizing compound (e.g., emulsifier) and a fuel application may involve the delivery and/or distributing of one or more emulsions.

In an exemplary embodiment a feedstock characteristic is determined including a feedstock material consisting of particles having a specific size. For example, coal particles may be within the size range of 70-80 microns.

In an exemplary embodiment a feedstock characteristic is determined including a determination that the feedstock or an ingredient of the feedstock should be mixed via a batch or a continuous process. For example, a predetermined quantity of fuel may be mixed as a batch for an incinerator that is calculated to run for a specific period of time to perform the incineration (e.g., of industrial waste). In contrast, a diesel fuel and emulsifier application may occur in a continuous manner, such that as long as ingredients are provided, the process does not stop.

In an exemplary embodiment, determining a feedstock characteristic may include determining that the feedstock material includes a non-Newtonian fluid that is represented by the Ostwald-de Waele equation and determining accompanying characteristics. For example, the feedstock material may include a coal in water slurry having an n-parameter of approximately 0.1-0.5 and a K parameter of approximately 4-8 (kg/m·s2-n) at 20° C. It is noted that other similar parameters may be obtained based on repeated testing. In these embodiments, the fuel application may include an industrial reactor (e.g., coal-slurry reactor).

In an exemplary embodiment, determining a feedstock characteristic may include determining costs or ease of production of one or more ingredients of the feedstock material. For example, a first ingredient (e.g., natural) may possess similar characteristics as a second ingredient (e.g., synthetic), but may cost more or may be more difficult to obtain. In such situations, often the second ingredient is used as opposed to the first to minimize overall costs, however, this may depend on other factors (e.g., environmental conditions, EPA regulations, etc.).

In an exemplary embodiment, determining a feedstock characteristic may include determining a desired flow rate of the feedstock material. For example, the feedstock material may need to be mixed further during flow from a hopper to a distribution mechanism. Thus, a desired flow rate of the feedstock material may need to produce turbulent flow according to a dispersion coefficient, such as in the relationship below:

$$D_{turbulent}=3.57\sqrt{f}VD$$

where $D_{turbulent}$ is a dispersion coefficient (e.g., axial dispersion coefficient), f is a friction factor, V is velocity (e.g., average velocity of the fluid), and D is diameter (e.g., pipe diameter).

In an exemplary embodiment, determining a feedstock characteristic may include determining a combined characteristic of feedstock ingredients. For example, a combined characteristic may include a type, size, and composition of a micelle. By way of another example, the feedstock may include one or more reactants, $r_A$, $r_B$, . . . $r_N$, and in some embodiments it may be desirable to combine the one or more reactants (e.g., in the delivery mechanism, or a portion thereof) with each other prior to being propelled out a distribution mechanism by the propellant so as to induce a chemical reaction and an emission (e.g., spray) having a specific concentration of a reactant and/or product. In some embodiments, it may be necessary to determine a mole balance of the chemical reaction, which for a steady state, tubular reactor (e.g., delivery tube) may be determined as follows:

$$\frac{dF_j}{dV}=r_j$$

It may also be necessary to determine at what point reactants are combined in order to produce a decomposition, combination, or isomerization of a reactant. To determine this point, a chemical reaction volume, $V_1$, necessary for the decomposition, combination, or isomerization of a particular reactant, rA, may be determined in order to ascertain the point at which reactants are combined. For example, the chemical reaction volume, $V_1$, may be determined as follows:

$$V_1 = \int_{F_{A0}}^{F_{A1}} \frac{dF_A}{r_A} = \int_{F_{A1}}^{F_{A0}} \frac{dF_A}{-r_A}$$

where $V_1$ may be characterized as a volume necessary to carry out a reaction such that an incoming flow rate, $F_{A0}$, is reduced to a specific value, $F_{A1}$, which by the nature of a chemical reaction, is also the volume necessary for a molar flow rate for generating a product (e.g., isomer, etc.).

In step (3) of an exemplary embodiment of a method disclosed herein, a propellant is selected and/or determined based on a feedstock characteristic determined in step (1). For example, selecting a propellant includes selecting the propellant from at least one of an inert gas, air, nitrogen ($N_2$), a low viscosity fluid, a miscible ingredient, an immiscible ingredient, and combinations thereof. For instance, if the feedstock characteristic determined includes a determination that the feedstock includes a volatile or labile ingredient, the selected propellant may be an inert gas or nitrogen.

In an exemplary embodiment selecting the propellant may include determining a flow rate of the propellant or how viscous a propellant may be based on a determined characteristic of the feedstock. For example, if the feedstock is determined as having a first velocity that is smaller than a distribution velocity (e.g., a rate at which the feedstock combined with a propellant leaves a nozzle), the propellant may need to have a specific velocity and/or viscosity, or be within a range of velocities and/or viscosities, to make up the difference and propel the feedstock to obtain the distribution velocity. For instance, the propellant is generally provided at low energy via one or more low pressures (e.g., 1-15 psi), thus the propellant may be required to have a specific velocity and/or viscosity or be within a range of velocities and/or viscosities (e.g., 0.01 to 1 cP) in order to make up the difference and cause the feedstock to reach the distribution velocity, which velocity and/or viscosity (or range thereof) may be determined using Reynolds number(s), friction factor(s), Bernoulli's equation, and/or combinations thereof.

In an exemplary embodiment, selecting the propellant based on a characteristic of the feedstock may include determining an allowable moisture content of the feedstock, and thus an allowable moisture content of the propellant. For example, some emulsified fuels have increased effectiveness (e.g., increased ability to flow in cold temperatures) when water content is reduced and/or minimized. In this regard, if an emulsified fuel is used and it already contains a maximum, or high, water content for overall effectiveness of the fuel used in a fuel application (e.g., combustion), then the propellant may need to be selected as nitrogen or carbon dioxide instead of air, depending on the water content of the air.

In step (4) of an exemplary embodiment of a method disclosed herein, a combined characteristic or a combining characteristic is determined based on bringing the feedstock and the propellant into contact with each other. For example, the combining characteristic or combined characteristic may include one or more of the following: combined flow rate, combined viscosity, resulting temperature upon combination, whether or not mixing is desired as a result of the combination, any resulting reactions or rates of reaction resulting from the combining, an angle of combination (e.g., angle at which propellant contacts the feedstock), and a resultant energy of the combination.

In step (5) of an exemplary embodiment of a method disclosed herein, a delivery mechanism and a distribution mechanism is selected and/or determined. For example, a delivery mechanism may be selected from one or more of the following: an auger; a low pressure pump, blower, or compressor; needle-like columns; capillary forces; first two opposing plates positioned at an angle to a second two opposing plates; an electric charge; and combinations thereof. For instance, the delivery mechanism may be selected from one or more of the delivery mechanisms depicted in FIG. 11.

In FIG. 11, there is shown in the top drawing a perspective view looking from the top of an embodiment of a seed or particle feeder 440 having a hopper 452 and first, second and third augers 446, 448 and 453. The hopper includes a rectangular outer wall portion 242, an inwardly tapered wall portion 444 ending in a flatbed which receives within recesses the augers 446, 448 and 453.

In FIG. 11, there is shown in the bottom-left drawing another perspective view of the embodiment 440 of a three-row seed or particle feeder and separator showing the single hopper 452 mounted vertically with three nozzles 454, 456 and 458 extending therefrom to be vibrated by a single vibrator 470 having yokes about each of the nozzles for vibrating them as described above in connection with single row seed or particle feeders and separators. Adjacent and above each of the nozzles 454,456 and 458 are corresponding separator nozzles 460, 462, and 464 adapted to be connected to a manifold 480 which receives a source of air under pressure at the connection 480 under the control of a valve 468 so as to control the pressure of the air flowing across the nozzles. This embodiment of seed or particle feeder and separator operates in the same manner as the prior embodiments and is adapted to be mounted to a planter to plant adjacent rows in close juxtaposition from a single hopper.

In FIG. 11, there is shown in the bottom-right drawing an embodiment of a gel or other prepared fluid drilling material-chemical dispenser 498 having a fixture 532A with an air source 340 and separation surface 540, and an additive line 538A connected to an additive source. The dispenser 498 for chemicals and gel or other prepared fluid drilling material may be used alone or mounted in tandem with a seed or particle feeder to have gel or other prepared fluid drilling material with additives separated by air from the nozzle 340 and deposited with seed from a seed or particle feeder. The fixture 532A may be vibrated, or may rely only on the force of the vibrator 334 to cause a continuous substantially uniform mixture of chemical additives and gel or other prepared fluid drilling material to be applied. In one embodiment, the fixture 532A is cut away at 540A to provide an open top channel to receive gel or other prepared fluid drilling material and the nozzle 540 of the separator is positioned to direct air under pressure directly at the open top of the channel and thus form a mist of gel or other prepared fluid drilling material-additive spray that is uniformly spread over any area. The opening is adjusted so that chemical additives are economically used and may be contained by the gel or other prepared fluid drilling material at a concentration Such that uniform and adequate distribution with the gel or other prepared fluid drilling material is obtained at the appropriate rate by controlling the pump speed, size of fixture 532A and speed of movement across a field with respect to the concentration of the material being applied.

By way of another example, a distribution mechanism may be selected from one or more of the following: a nozzle attached directly to a delivery tube; an atomizing spray fixture; multiple sets and/or configurations of nozzles; an air-assist nozzle; a nozzle with a separator; an opening between a plate and a spray fixture; and combinations thereof. For instance, the distribution mechanism may be selected from fixtures depicted in FIGS. 9 and 10 or in U.S. Pat. No. 9,148,994, issued on Oct. 6, 2015, filed Nov. 12, 2012, by John Alvin Eastin, et al., which is incorporated herein by reference in its entirety.

Figure 9:
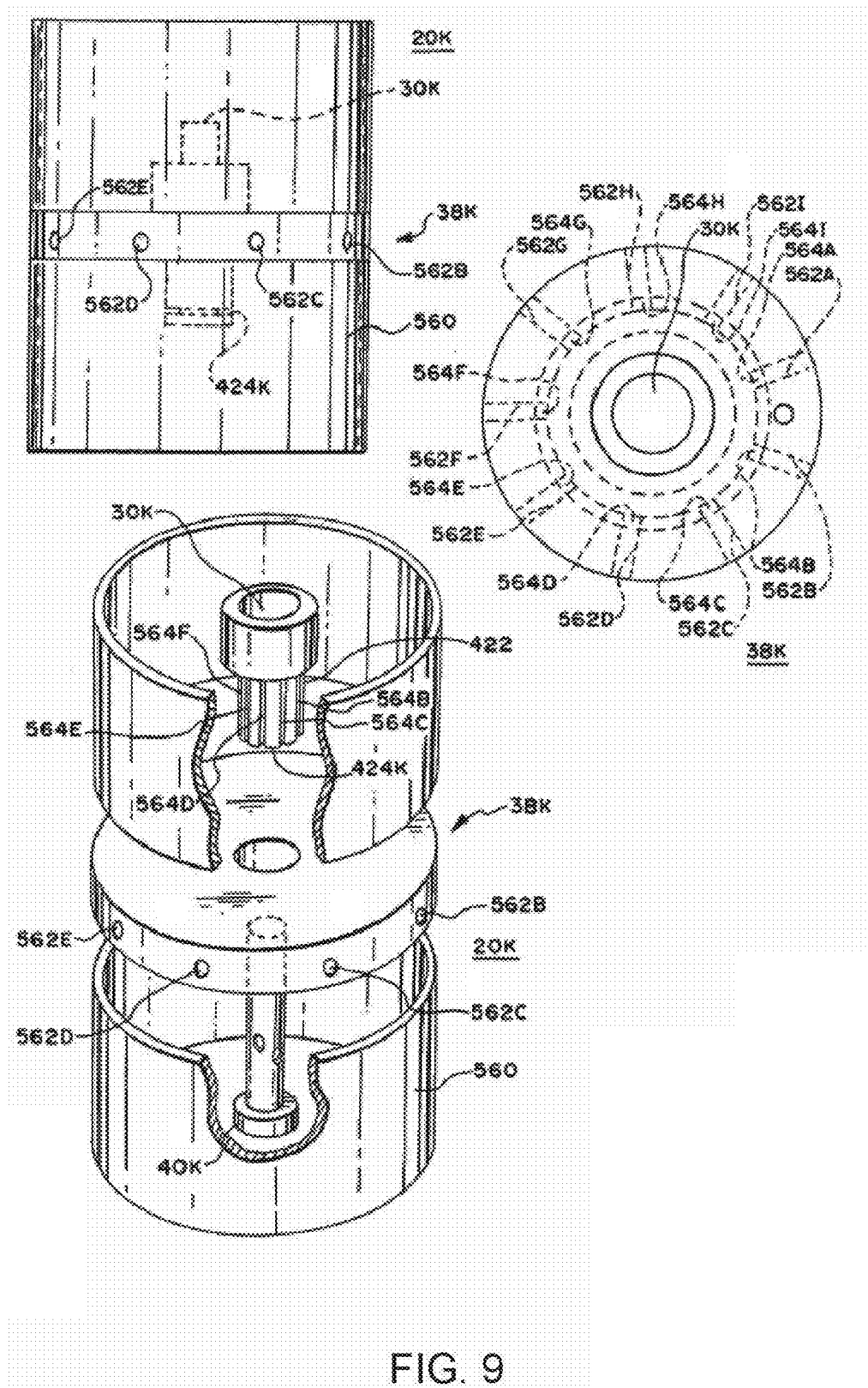
FIG. 9 illustrates sectioned and exploded views of a spray fixture, in accordance with one or more embodiments of the present disclosure.

In FIG. 9, the top-left drawing is shown a simplified schematic view, partially perspective and partially sectioned view of an embodiment of fixture 20K adapted to mix a plurality of liquids or particles without regard as to whether the liquids are viscous or mobile. The fixture 20K includes a mixing chamber 560, a kinetic energy inlet 30K, an inlet 38K for a plurality of fluids or particles and an outlet 424K. The fixture 20K receives a plurality of fluids which may be of any viscosity or may be mobile or may consist of particles or emulsions or other combinations in the inlet member 38K while receiving air or other kinetic energy fluid through the kinetic energy inlet 30K. The outlet 424K emits gaseous clouds of droplets or fine particles made up of the different inlets which are mixed together in the mixing chamber 560. From the mixing chamber 560 they may flow to a nozzle for spraying or may flow to a combustion device for burning or any other location where the mixture is affective. The inlet member 38K includes a plurality of openings leading inwardly 562A-562I (referring to the middle-right drawing of FIG. 9) with openings 562B-562E being shown in the top-left drawing of FIG. 9.

In FIG. 9, there is also shown in the bottom drawing an exploded view of the fixture 20K showing the kinetic energy inlet 30K and the bottom plate 40K of the outlet opening 424K (of the top-left drawing of FIG. 9). As made clearer in the bottom drawing of FIG. 9, the opening 424K extends 360 degrees around the longitudinal central axis. However, it can be any number of degrees or any of the fixtures since that merely determines the size of dimension the liquid and this is the amount of liquid inputted by the surface force. Thus the size of the droplets and the range of spreading and can be tailored to an individual application. The inlet opening of the inlet 38K extends to channels or slots circumferentially spaced from each other in the thickness control insert 422. In the embodiment of the bottom drawing of FIG. 9, instead of a recessed cylinder the thickness control insert 422 is cylindrical with longitudinal channels extending downwardly to the outlet 424K (top-left drawing of FIG. 9) so that liquid flowing through the channels from the inlets to connect with a corresponding one of the channels 564A 564K (564B-564F being shown in the bottom drawing of FIG. 9). The fluid or particles are channeled through the channels down to the outlet and against the bottom plate 40K. As in the prior embodiments, the thickness insert may be adjusted as to its distance between the bottom plate 40K to determine the thickness of fluid and thus affect the size of the droplets being emitted.

In FIG. 9, there is shown in the center-right drawing a sectional view of the member 38K showing the inlet channels 562A-562I and the corresponding downward slots 564A-564I. As shown in this view, the different fluids flow downwardly to the outlet where they are impacted by the kinetic energy fluid flowing through the kinetic energy inlet 30K and thus form a cloud of droplets to be mixed in the mixing chamber 560 (top-left drawing of FIG. 9).

Figure 10:
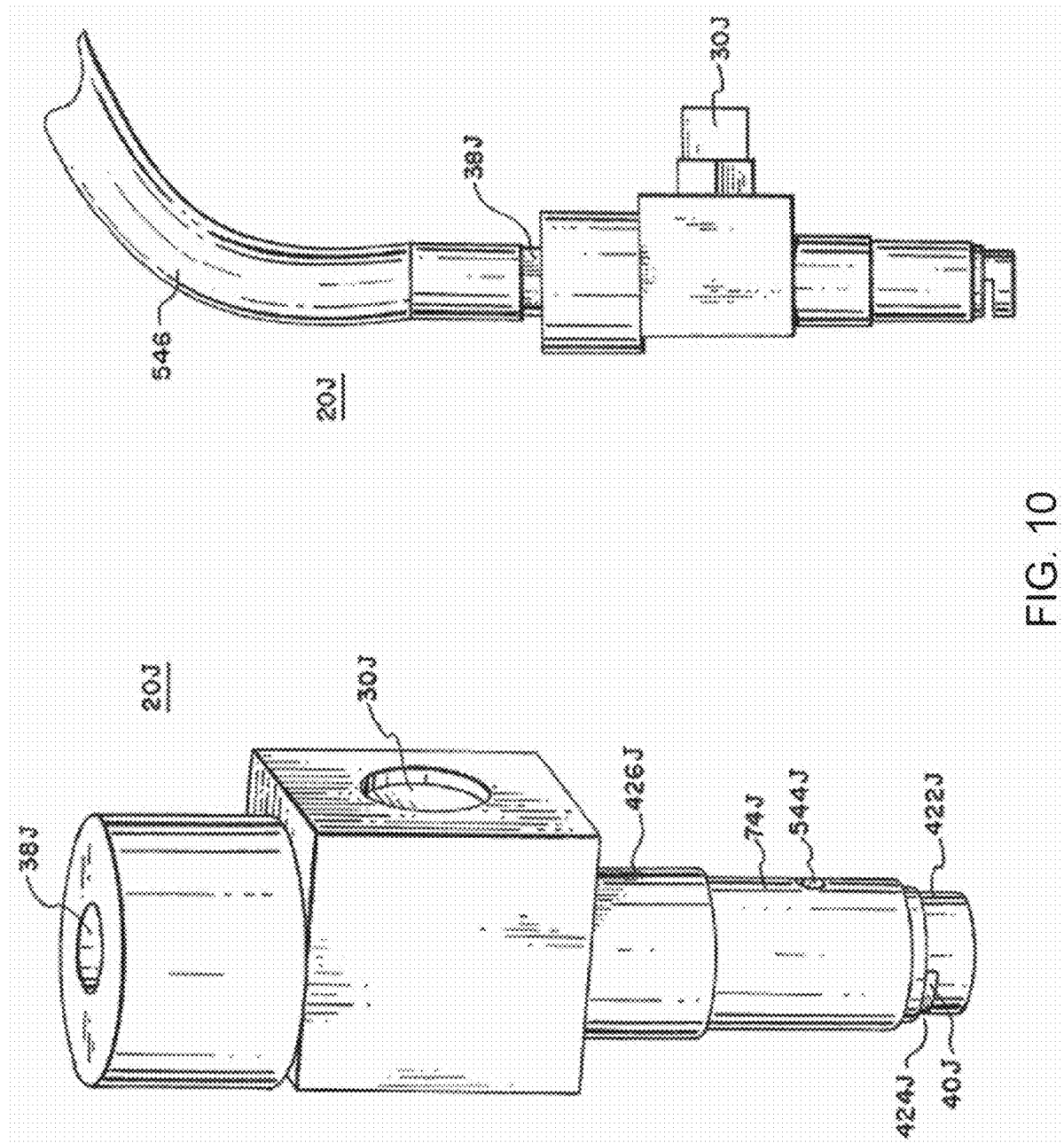
FIG. 10 illustrates side views of a nozzle, in accordance with one or more embodiments of the present disclosure.

In FIG. 10, there is shown in the left drawing a perspective view of an embodiment of a fixture having a feed stock inlet opening 38J, a kinetic energy fluid inlet 30J and an outlet opening 424J having an opening distance controlled by the location of the insert 422J and the outlet cylinder 74J. A threaded opening receives a screw for holding the distance between the insert 426J and the outlet cylinder 74J which determines the size of the opening 424J and thus will affect droplet size. With this embodiment, the kinetic energy inlet 30J may receive air from the normal fuel line of an agricultural boom and the feedstock inlet opening 38J may receive low pressure agricultural input. This is possible because this fixture permits low pressure fluid to be utilized with the air assist. Because a fluid may be more concentrated using the fixture, it does not need to be diluted and a lower rate of flow of the fluid to the fixture is possible.

In FIG. 9, there is also shown in the right drawing an elevational view of the fixture 20J with the feed stock inlet connected to a hose 546 for receiving an agricultural input and applying it to the feed stock inlet opening 38J of the fixture 20J. The airline receives a nipple from the boom to receive pressurized air so as to provide a spray to crops or the like.

In step (6) of an exemplary embodiment of a method disclosed herein, an applicator is configured for the spray application selected and the characteristics determined. For example, the type of applicator may be one of a burner, a multiple nozzle configuration, or a combination thereof. The delivery means (e.g., tube, pipe, slit, corrugated tubing, etc.), length, geometry, etc., may be determined using an equation/relationship including but not limited to, Bernoulli's equation, Reynolds Number, friction factors, etc. The Application environment may also be determined, including, but not limited to, a humidity, pressure, ambient temperature, air flow, ventilation, and combinations thereof. A determination may also be made as to whether a pre-existing applicator (e.g., spray vehicle) may be retrofitted. Flow rates and/or speeds of the applicator and/or related components (e.g., conveyor belt, water in a heat exchanger, etc.) may also be determined in order to configure the applicator for the desired application (e.g., boiler, heat exchanger, etc.). The application characteristics (e.g., drop patterns, fibers, mists, etc.) may also be determined at this step.

In step (7), the application is performed according to the various determinations made. For example, the methods and apparatuses disclosed herein may be useful for fuel applications including a scrubber application. For example, a scrubber apparatus may be incorporated with a delivery mechanism and/or a distribution mechanism as disclosed herein.

It is noted that while some of the inventive concepts may be discussed with respect to fuel applications including a scrubber application and/or process, the inventive concepts will be recognized by those skilled in the art to be applicable to other applications and/or processes (e.g., separators). For example, referring now to FIG. 7, an exemplary embodiment of a fuel system 100 according to the inventive concepts disclosed herein, may include an applicator or spray fixture 102, a distribution mechanism 104, a delivery mechanism 106, and a propellant source 108. In other embodiments, the fuel system 100 may optionally include a chamber 110; delivery means 112; an air, additive, and/or recycle inlet 114; an exhaust/outlet 116; outputting means 118; and a collector 120.

Figure 8:
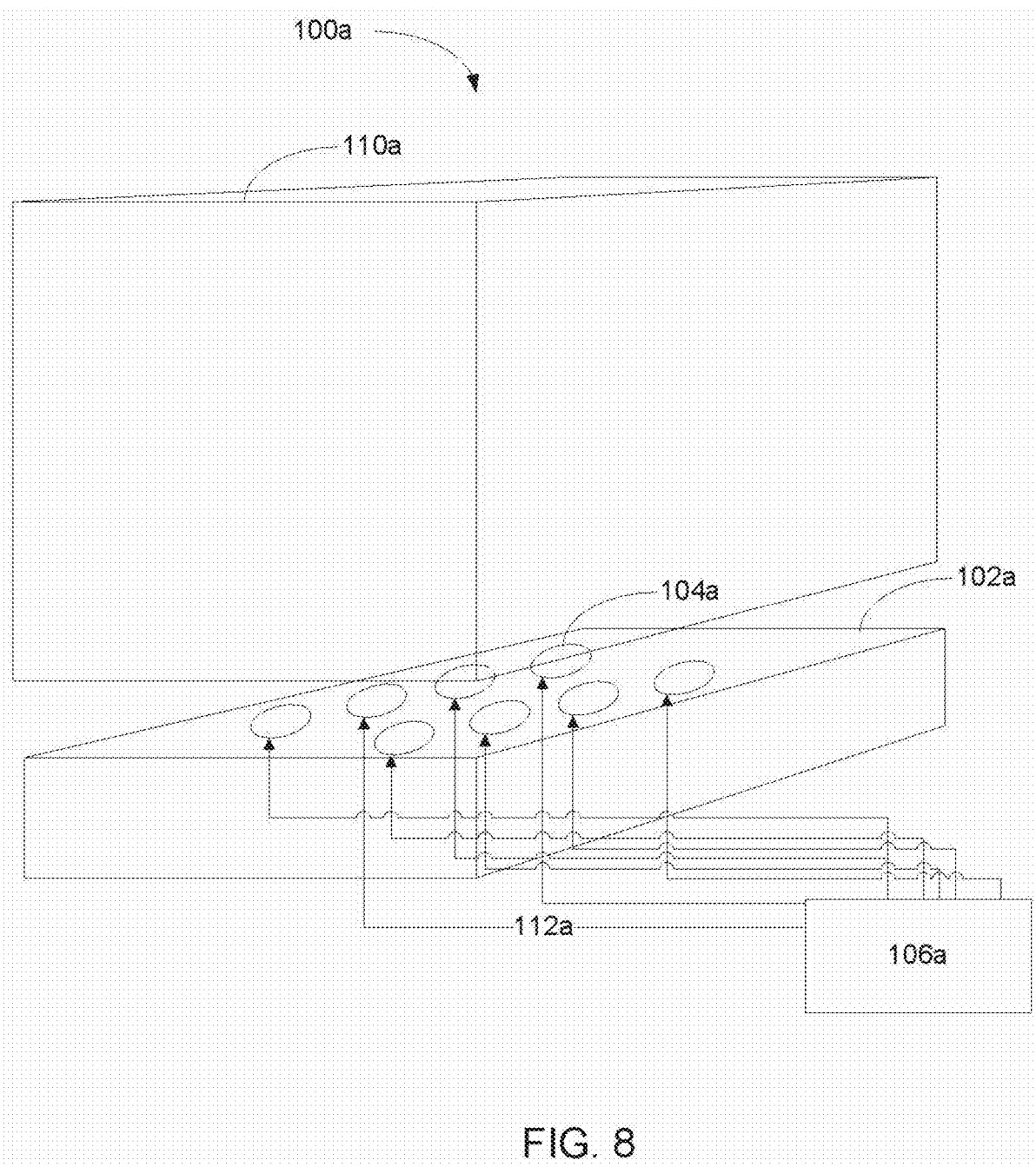
FIG. 8 shows a schematic of a boiler and applicator, in accordance with one or more embodiments of the present disclosure.

In an exemplary embodiment, the applicator or spray fixture 102 may include a configuration or arrangement with multiple distribution mechanisms 104. For example, referring now to FIG. 8, the applicator or spray fixture 102a may be configured to be placed under a heat exchange chamber 110a of a thermal fluid heater or boiler 100a. In this regard, the applicator or spray fixture 102a may include multiple nozzles 104a in communication with fuel-valve delivery mechanism 106a via multiple tubes/pipes 112a. A nozzle of the multiple nozzles 104a may be a nozzle indicated in FIG. 9 or in FIG. 10. It is noted that the depictions of the nozzle or multiple nozzles 104a in FIGS. 9-10 are for illustrative purposes, as other nozzles are encompassed by the inventive concepts disclosed herein (see, for example, nozzles described generally in U.S. Pat. No. 9,148,994, issued on Oct. 6, 2015, filed Nov. 12, 2012, by John Alvin Eastin, et al., which is incorporated herein by reference in its entirety). It is noted that the depiction of the chamber 110a is merely for illustrative purposes and is not meant to be limiting, as the chamber 110a could include any number of chambers known in the art. For example, the chamber 110a could be a chamber within a fluidized bed reactor.

Figure 12:
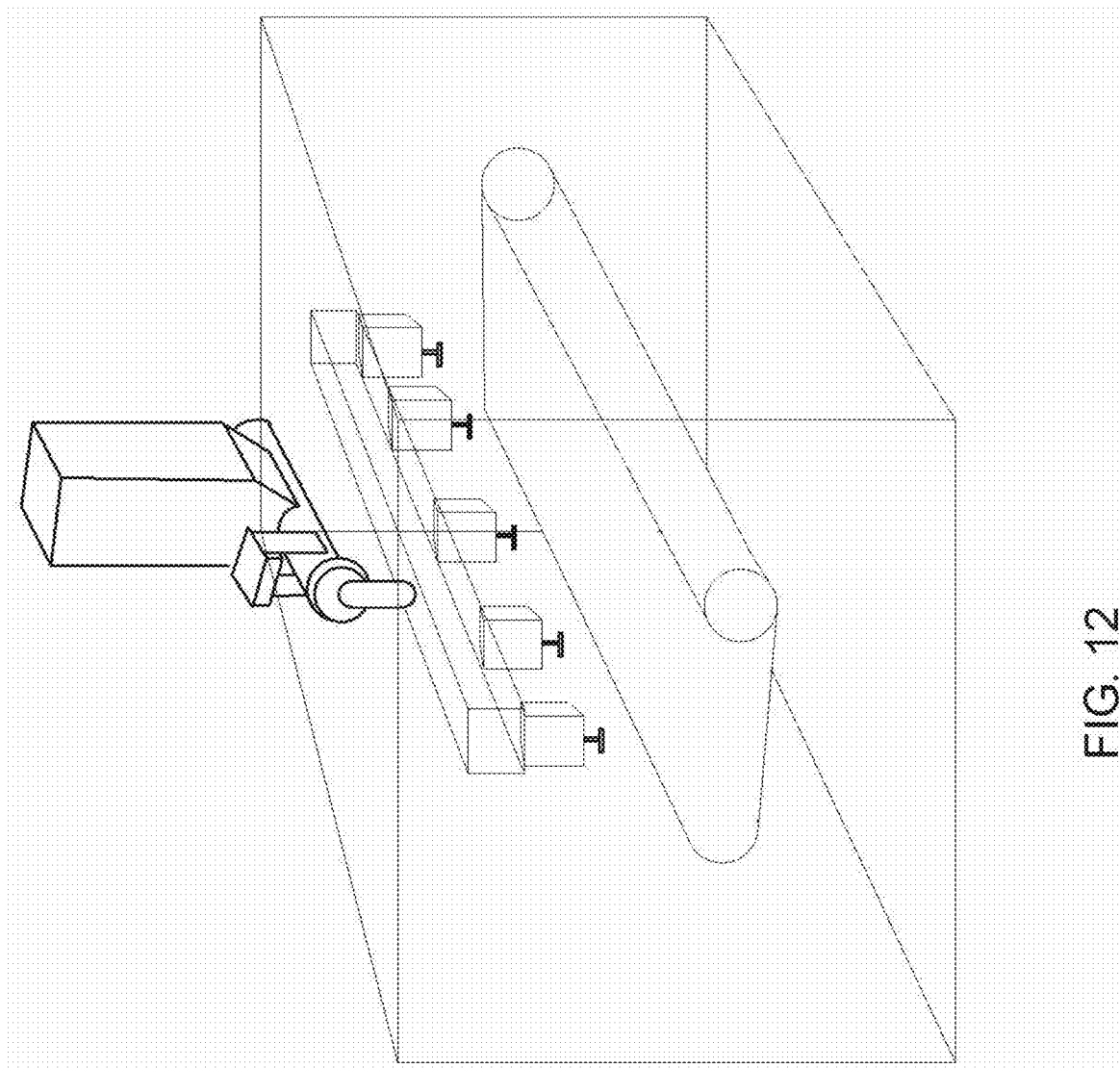
FIG. 12 shows a schematic of a spray drier, in accordance with one or more embodiments of the present disclosure.
Figure 13:
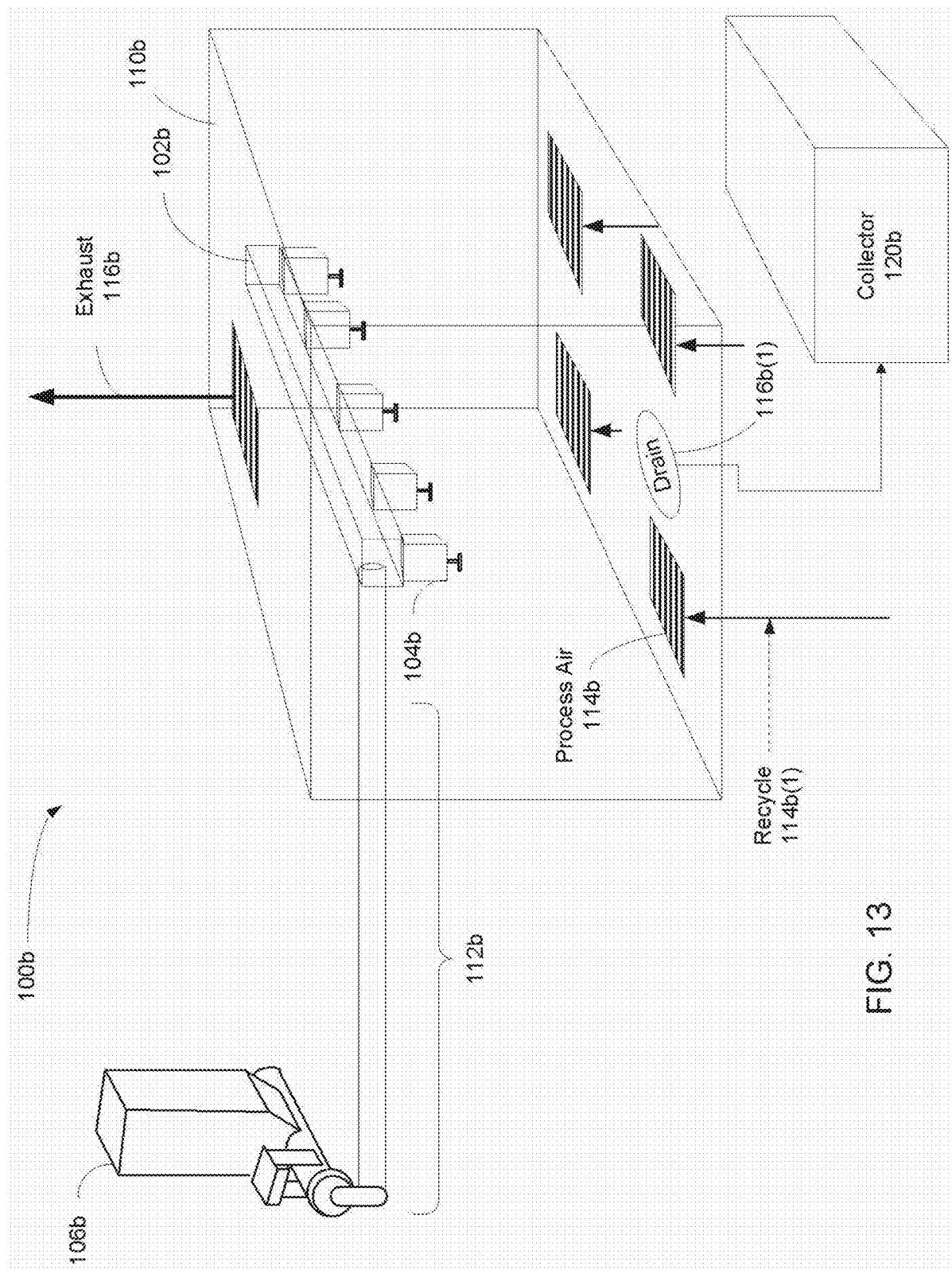
FIG. 13 shows a schematic of a scrubber apparatus, in accordance with one or more embodiments of the present disclosure.

It is further noted that the inventive concepts disclosed herein are not limited to the thermal fluid system or combustion applications. For example, the inventive concepts may be applied to a spray drying process or a spray dryer as depicted in FIG. 12. By way of another example, the inventive concepts may be applied to a scrubber application or a scrubber apparatus 100b as depicted in FIG. 13. It is noted that system 100b may function similarly to system 100 except that the spray fixture or applicator 102, the distribution means 104, the delivery means 112, and other components may be configured for a different fuel application (e.g., scrubbing).

Referring now to FIG. 13, an exemplary embodiment of a scrubber apparatus 100b, according to the inventive concepts disclosed herein, may include a scrubbing applicator 102b for applying wet, dry, or otherwise viscous media. The scrubber apparatus 100b may further include a scrubbing chamber 110b having a process gas inlet 114b, an exhaust/outlet 116b (e.g., particulates, pollutants, and other harmful emissions removed or substantially removed), outputting means (e.g., pipe, tubing, vent, etc.), and a collector 120b for collecting the scrubbing material (e.g., wet/dry scrubbing agent) combined with the particles, pollutants, or other harmful emissions.

In an exemplary embodiment, the delivery mechanism 106b may be configured to deliver a scrubbing agent (e.g., oil, limestone, etc.) to the scrubber apparatus 100b. The delivery mechanism 106b may include a low pressure delivery mechanism. For example, the delivery mechanism 106b may include one or more augers, one or more low pressure pumps (e.g., 1-15 psi or 6.89 to 103.42 kPa), or combinations thereof. In embodiments, the scrubbing agent may include, but is not limited to, a slurry, pulverized lime, medium to high viscosity oil, or combinations thereof, which are delivered via delivery means 112b (e.g., auger, smooth or corrugated tubing, pipe, pex tubing, hose, gear, pump, or combinations thereof). In some embodiments, the feedstock including the scrubbing agent is used in combination with a propellant being forced against a feedstock outlet or a surface of the feedstock outlet at a higher pressure (e.g., higher than 1-15 psi or 6.89 to 103.42 kPa).

In an exemplary embodiment the applicator 102b may include one or more distribution mechanisms 104b configured to distribute the scrubbing agent to the chamber 110b. For example, the one or more distribution mechanisms 104b may include a first and a second set of fixtures, each set having nozzles configured to adjustably spray the scrubbing agent within the chamber 110b. In this regard, the ability to adjust the distribution of the scrubbing agent may be enabled by moveable plates interacting with a first flow of feedstock or a second flow of propellant, adjusting an angle of one or more moveable plates, adjustable flow rates of either the feedstock or the propellant, adjust a spacing between two or more plates with at least one of the two or more plates being moveable, adjusting a size of an outlet opening, adjusting an angle of an outlet opening, adjusting a thickness insert, adjusting a distance between a bottom plate and one or more outlets, adjusting a charge induced onto or applied to drops emitted from the fixture, adjusting a rotatable outer cap of an annular fixture, rotating inner cylinders of a fixture with respect to outer cylinders, aligning or misaligning impact surfaces of a fixture, adjusting a rate of rotation of cylindrical rotating drums associated with a fixture, and combinations thereof.

In some embodiments, the ability to adjust the distribution of the scrubbing agent is further enhanced by adjusting properties (e.g., physical, chemical, etc.) of the feedstock material and the propellant. For example, temperatures (e.g., pre-heat temp.), flow rates, viscosities, compositions, fluidities, velocities, pressures, and combinations thereof may be adjusted.

Referring again to FIG. 13, the inlet 114b and the exhaust/outlet 116b may include one or more vents formed into a floor or a roof of the chamber 110b. In some embodiments, one or more of the vents (e.g., vent on same surface as floor) may be configured to allow material (e.g., process air flow) to enter the chamber 110b but to restrict material from exiting the chamber 110b. For example, a one-way valve or rubber liners/flaps may be used. It is noted that the depiction of the chamber 110b is merely for illustrative purposes and is not meant to be limiting, as the chamber 110b could include any number of chambers known in the art. For example, the chamber 110b could be a chamber within a fluidized bed reactor.

In some embodiments, the inlet or process air 114b may include additives or other processes affecting the inlet or process air 114b. For example, the inlet or process air 114b may include a recycle loop 114b(1) for recycling one or more products/by-products from the exhaust 116b or from another combustion process. For instance, the scrubber may be used in a carbon-capture-and-sequestration (CCS) process in which CO2 is recycled until it reaches a certain concentration at which it is purified, removed, sequestered, or combinations thereof.

In some embodiments, such as those employing a wet scrubber process, a wetting agent may include a high- or medium-viscosity fluid which is delivered to the scrubbing chamber 110b. The wetting agent may affect a density of particulates in process air 114b such that they fall to the bottom of the scrubbing chamber 110b and exit through a drain 116b(1) located at the bottom of the scrubbing chamber 110b. For example, in some embodiments a liquid sprayed from the scrubber includes an oil (e.g., organic or synthetic) and the process air includes particulates or contaminates with lipophilic properties (e.g., PAH).

Figure 14:
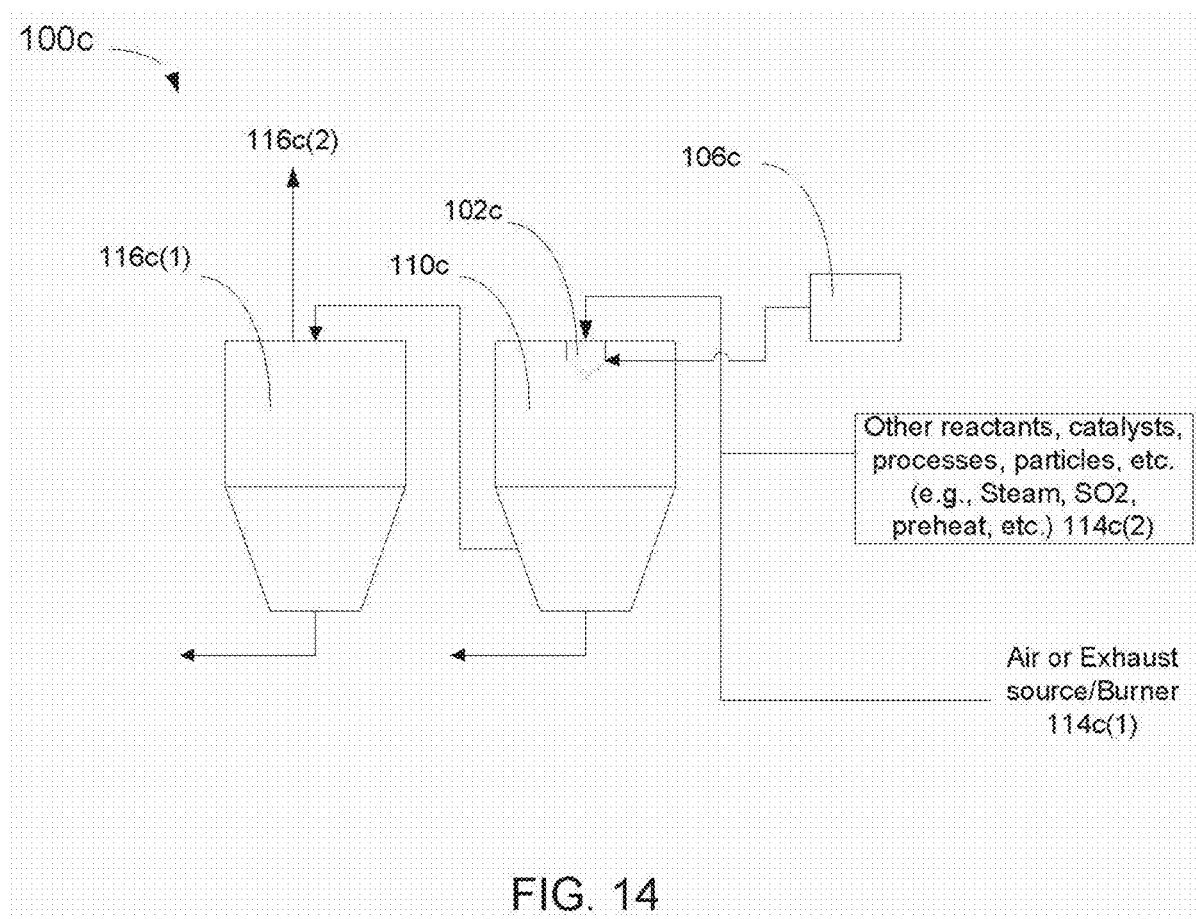
FIG. 14 shows a schematic of a scrubber apparatus, in accordance with one or more embodiments of the present disclosure.

Referring now to FIG. 14, in some embodiments, a scrubber 100c may function similarly to the scrubber 100b except that the scrubber 100c may be configured to utilize a dry scrubbing agent. The scrubber apparatus 100c may include a separator/outlet 116c(1), a chamber 110c, an inlet or process air source 114c(1), and other processes 114c(2) (e.g., addition of one or more additional reactants, temperatures, catalysts, particles, pollutant streams/flows, or combinations thereof).

In some embodiments, the separator/outlet 116c(1) may further include a bag house with one or more filters (e.g., fabric filter) to remove dry reactant (e.g., dry scrubbing agent and one or more pollutants) from an exhaust or a vented air stream.

In some embodiments, the chamber 110c may include a spray dryer chamber.

In some embodiments, the delivery mechanism 106c may utilize low pressures and/or one or more augers to deliver a dry scrubbing agent (e.g., limestone-90% CaCO3, slaked lime-90% Ca(OH)2, etc.) to an air source or an exhaust (e.g., such as in a flue gas desulfurization process). The use of the low pressures and/or the one or more augers may help enhance overall efficiency of the process.

In some embodiments, the delivery mechanism may utilize low pressures to deliver a lipophilic, high viscosity fluid to encapsulate (e.g., perform encapsulation) a pollutant or contaminant found in process air, such that the pollutant or contaminant is not emitted, or a concentration is reduced, in the exhaust.

In some embodiments, the distribution mechanism may include a nozzle. In embodiments, the nozzle may include a shearing knife and propellant (e.g., air flow directed at the nozzle) to remove a portion of the high viscosity fluid from a tip of the nozzle.

In embodiments, a fluid drilling delivery mechanism is utilized, which may include one or more augers having threads designed for low pressure delivery of a feedstock material via a shearing surface of the thread for delivery to a distribution mechanism. It is noted that more information regarding the delivery mechanism and distribution mechanism is provided below.

In embodiments, the scrubber may also include a collector 120b. In some embodiments, the collector 120b is in fluid communication with the drain 116b(1). For example, the feedstock material including a medium- to high-viscosity fluid may be sprayed from the distribution mechanism as process air enters the scrubbing chamber. The feedstock material may exit through the drain and into pipes or conduit that lead to a collector. The material is allowed to accumulate in the collector 120b, and then may be used for a dedicated process (e.g., soil treatment method, synthetic gypsum production, etc.).

In some embodiments, a first and/or a second set of nozzles 104 (e.g., not shown in FIG. 13 or 14 above) may be included with the scrubber. The first set may be used to distribute a scrubbing agent. The second set of nozzles may be utilized to distribute a second fluid, or a medium- to low-viscosity fluid. The medium- to low-viscosity fluid may be used in conjunction with the medium- to high-viscosity feedstock material. It is noted that the use of the second set of nozzles and the second fluid may ensure that the feedstock material exits the chamber through the drain. For instance, the second fluid may include water, and the water may rinse the feedstock material from the exposed surfaces of the chamber and cause the feedstock material to flow into the drain and collector. In embodiments, the second fluid is sprayed periodically. In other embodiments, the second fluid is sprayed constantly together with the feedstock material.

It is noted that in some embodiments, the distribution mechanism 104 or the delivery mechanism 106 may incorporate a pulse dampener. For example, the pulse dampener may be used to ensure that the feedstock material is conveyed at an even distribution rate (i.e., instead of at frequent, pulsing intervals).

Referring now to FIG. 15, an exemplary embodiment of a method 1500 for scrubbing according to the inventive concepts disclosed herein may include one or more of the following steps.

A step (1) may include determining a scrubbing application. For example, the scrubbing application determined may include a wet/dry application, a Venturi application, and/or a technique for removing particulates from process air (e.g., from an industrial reactor or reaction). By way of another example, the scrubbing application may include using the nozzles and/or distribution mechanisms disclosed herein to coat filter media, wherein the filter media may be removed from the coating station and inserted into a scrubbing chamber that is separate from the coating station.

In step (2) of an exemplary embodiment of a method disclosed herein, one or more characteristics of the feedstock or a feedstock material/ingredient are determined. In some embodiments, a feedstock characteristic is determined including a determination of a viscosity of a fluid (e.g., feedstock). For example, a viscometer may be used to determine the viscosity of the fluid. In other embodiments, feedstock characteristics determined may include determining particulate size of a pulverized lime feed or a viscosity of a lime slurry. For example, one or more Particle Size Analyzers (PSAs) may be used based on Brownian motion, image processing, gravitational settling, light scattering, and combinations thereof.

In some embodiments, the determining of feedstock characteristics may include one or more calculations. For example, a volumetric flow rate (e.g., liquid and/or vapor) may be calculated. In this regard, flow rate (e.g., velocity) and cross sectional area may be used for the calculation. By way of another example, a calculation may include calculating Bernoulli's Equation, or a form thereof.

In some embodiments, the determination that a feedstock includes a medium- or high-viscosity fluid may include a determination that the feedstock should include an amphiphile. For example, the feedstock may be sprayed from a nozzle or may be applied to a soil surface, and may include a surfactant and/or a wetting agent. In some embodiments, the surfactant includes, but is not limited to, a rhamnolipid, sodium dodecyl benszenesulfonate, abietic acid, dimethyl ether of tetradecyl phosphonic, polyethoxylated octyl phenol, glycerol diester (diglyceride), sorbitan monoester, dodecyl betaine, N-dodecyl prriridinium chloride. In some embodiments, the wetting agent includes a sulfo-carboxylix compound, including but not limited to, di-bis-ethyl-hexyl sulfosuccinate and di-bis (ethyl-hexyl) sodium sulfosuccinate. By way of another example, the feedstock may be sprayed or applied to soil in the form of an emulsion, thus, the amphiphile may include an emulsifier or an emulsifying agent. For instance, mono- and diesters of fatty alcohols (R—OH), neutralized by an alkaline hydroxide or a short amine may be used. In some embodiments, the emulsifier includes a diglyceride phosphoric acid (e.g., lecithin).

In some embodiments, the amphiphile is anionic. In other embodiments, the amphiphile is cationic. For example, the amphiphile may include benzalkonium chloride (or a salt thereof). In other embodiments, the amphiphile is zwitterionic. For example, the amphiphile may include one or more fatty acid amides, amino acids, or betaines, including but not limited to, cocamidopropyl betaine, alkyl betaines, sulfobetaines, alkyl sulfobetaines, dilyceride amino phosphoric acid, and combinations thereof.

In some embodiments, the determination of a feedstock characteristic includes determining the feedstock is a wetting agent. In other embodiments, the determination of a feedstock characteristic includes determining that the feedstock needs to include a wetting agent.

In some embodiments, the determination that a feedstock includes a high viscosity fluid includes a determination that a feedstock includes a glycoside. For example, the feedstock may include a saponin. For example, saponin may be a useful ingredient in forming an emulsion of the feedstock material. In embodiments, an emulsion may be utilized to encapsulate volatile pollutants prior to exhaust emission in order to reduce pollutant concentration levels.

In an exemplary embodiment a feedstock characteristic is determined such that an ingredient of the feedstock does not mix well with another feedstock material/ingredient. For example, an emulsion may be termed a dispersion of two or more immiscible liquids in the presence of a stabilizing compound (e.g., emulsifier or emulsifying agent) and a scrubber application may involve the delivery and/or distributing of one or more emulsions.

In an exemplary embodiment a feedstock characteristic is determined including a feedstock material consisting of particles having a specific size. For example, particles may be the size of onion seeds. By way of another example, particles may be in the size range of 2 mm to 75 microns. By way of yet another example, particles may be from 1 to 10 microns. In embodiments, particles present in the feedstock material may include charcoal, limestone, slack lime, or a catalyst, in order to help reduce pollutant concentration levels in an exhaust.

In an exemplary embodiment a feedstock characteristic is determined including a determination that the feedstock or an ingredient of the feedstock should be mixed via a batch or a continuous process. For example, a predetermined quantity of feedstock material may be mixed as a batch of emulsion for a specific volume of process air or a specific period of time the process resulting in the process air will take place. In contrast, a scrubber application may occur in a continuous manner, such that as long as feedstock material and process air are provided, the scrubbing process does not stop.

In an exemplary embodiment, determining a feedstock characteristic may include determining an ability to obtain a desired coverage. This determination may be related to a determined viscosity of the fluid and a volume and/or surface area of the scrubbing chamber. For example, nozzles may be positioned to spray an entire surface area of a scrubbing chamber. In this regard, the desired coverage may be 100% chamber surface area coverage, however, despite using a high viscosity emulsion as the feedstock material, an obtainable coverage may be 80-90%. Thus, an amount of feedstock material provided for the coverage may be reduced according to the amount of obtainable coverage in order to decrease superfluous material distribution.

In an exemplary embodiment, determining a feedstock characteristic may include determining costs or ease of production of one or more ingredients of the feedstock material. For example, a first ingredient (e.g., natural) may possess similar characteristics as a second ingredient (e.g., synthetic), but may cost more or may be more difficult to obtain. In such situations, often the second ingredient is used as opposed to the first to minimize overall costs, however, this may depend on other factors (e.g., environmental conditions, EPA regulations, etc.).

In an exemplary embodiment, determining a feedstock characteristic may include determining a desired flow rate of the feedstock material based on a delivery mechanism. For example, the feedstock material may need to be mixed further during flow to a distribution mechanism. Thus, a desired flow rate of the feedstock material may need to produce turbulent flow according to a dispersion coefficient, such as in the relationship below:

$$D_{turbulent}=3.57\sqrt{f}VD$$

where $D_{turbulent}$ is a dispersion coefficient (e.g., axial dispersion coefficient), f is a friction factor, V is velocity (e.g., average velocity of the fluid), and D is diameter (e.g., pipe diameter).

In step (3) of an exemplary embodiment, a process gas (e.g., process air) characteristic is determined. For example, the process gas may be determined to include ingredients, components, or particles that are labile and/or highly volatile. By way of another example, the process gas may be determined to include ingredients, component, or particles that are lipophilic. For instance, process air may include one or more aromatic hydrocarbons (e.g., polycyclic aromatic hydrocarbons (PAH)). Due to the lipophilic properties of some of the ingredients of the process air (e.g., PAH), the highly viscous feedstock material (e.g., oil) may be more effective than water alone at removing pollutants from the process air before it is emitted as exhaust. It is noted that the determination of characteristics of the process gas may affect determination of feedstock material characteristics in step (2) or propellant characteristics in step (4).

In step (4) of an exemplary embodiment of a method disclosed herein, a propellant and/or feedstock material is selected and/or determined based on a feedstock characteristic determined in step (1) and/or a process gas characteristic determined in step (3). For example, selecting a propellant includes selecting the propellant from at least one of an inert gas, air, nitrogen ($N_2$), a low viscosity fluid, a miscible ingredient, an immiscible ingredient, and combinations thereof. For instance, if the process gas characteristic determined includes a determination that the process gas includes a volatile or labile ingredient, the propellant may be selected from multiple inert gases including nitrogen. By way of another example, if the process gas is determined to include a labile ingredient (e.g., PAH) the feedstock material may be determined to include an oil (e.g., fish oil or other oil beneficial to fertilizers).

In an exemplary embodiment selecting the propellant may include determining a flow rate of the propellant or how viscous a propellant may be based on a determined characteristic of the feedstock. For example, if the feedstock is determined as having a first velocity that is smaller than a distribution velocity (e.g., a rate at which the feedstock combined with a propellant leaves a nozzle), the propellant may need to have a specific velocity and/or viscosity, or be within a range of velocities and/or viscosities, to make up the difference and propel the feedstock to obtain a determined distribution velocity. For instance, the propellant is generally provided at low pressures (e.g., 1-15 psi), thus the propellant may be required to have a specific velocity and/or viscosity or be within a range of velocities and/or viscosities (e.g., 0.01 to 1 cP) in order to make up the difference and cause the feedstock to reach the distribution velocity, which velocity and/or viscosity (or range thereof) may be determined using Reynolds number(s), friction factor(s), Bernoulli's equation, and/or combinations thereof.

In step (5) of an exemplary embodiment of a method disclosed herein, a combined characteristic or a combining characteristic is determined based on bringing the feedstock and the propellant into contact with each other. In other embodiments, the combined characteristic may be determined based on brining the propellant, feedstock material, and the process gas into contact with each other. For example, the combining characteristic or combined characteristic may include one or more of the following: combined flow rate, combined viscosity, resulting temperature upon combination, whether or not mixing is desired as a result of the combination, any resulting reactions or rates of reaction resulting from the combining, an angle of combination (e.g., angle at which propellant contacts the feedstock), and a resultant energy of the combination.

Figure 11:
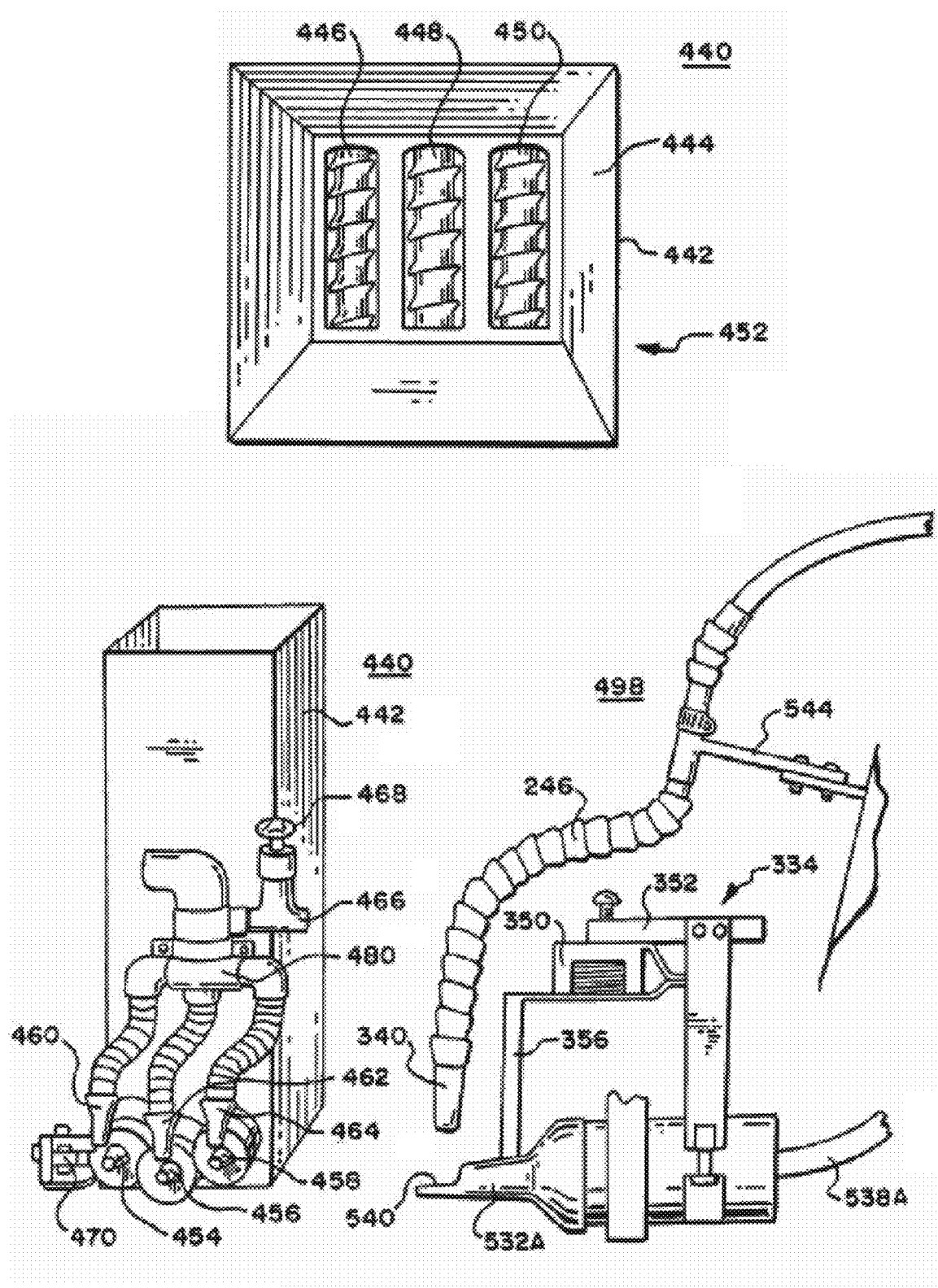
FIG. 11 illustrates top and side perspective views of a seed or particle feeder, in accordance with one or more embodiments of the present disclosure.

In step (6) of an exemplary embodiment of a method disclosed herein, a delivery mechanism and a distribution mechanism is selected and/or determined. For example, a delivery mechanism may be selected from one or more of the following: an auger; a low pressure pump, blower, or compressor; needle-like columns; capillary forces; first two opposing plates positioned at an angle to a second two opposing plates; an electric charge; and combinations thereof. For instance, the delivery mechanism may be selected from one or more distribution mechanisms depicted in FIG. 11 (but not limited to these distribution mechanisms, see e.g., distribution mechanisms described generally in U.S. Pat. No. 9,148,994, issued on Oct. 6, 2015, filed Nov. 12, 2012, by John Alvin Eastin, et al., which is incorporated herein by reference in its entirety).

By way of another example, a distribution mechanism may be selected from one or more of the following: a nozzle attached directly to a delivery tube; an atomizing spray fixture; an opening between a plate and a spray fixture; and combinations thereof. For instance, the distribution mechanism may be selected from one or more of the nozzles in FIGS. 9-10 (but not limited to these nozzles).

In step (6) of an exemplary embodiment of a method disclosed herein, an applicator is configured for the application determined (e.g., Venturi scrubber application) and the characteristics of the different fluids involved are determined. For example, the type of applicator may be one of a Venturi scrubber, an orifice scrubber, a fiber-bed scrubber, a spray nozzle scrubber, an impingement-plate scrubber, a mechanical scrubber, or combination thereof. The delivery tube type (e.g., pipe, slit, corrugated tubing, etc.), length, geometry, etc., may be determined using an equation/relationship including but not limited to, Bernoulli's equation, Reynolds No., friction factors, etc. The Application environment may also be determined, including but not limited to, a humidity, pressure, ambient temperature, air flow, ventilation, and combinations thereof. A determination may also be made as to whether a pre-existing applicator (e.g., spray nozzle) may be retrofitted. A speed of the applicator and/or related components may also be determined in order to configure the applicator for the desired scrubbing application. The application characteristics (e.g., drop patterns, mists, etc.) may also be determined at this step.

In step (7), the scrubbing application is performed according the various determinations made. Step 7 may include delivering feedstock to a distribution mechanism such as a nozzle. In embodiments, the delivery of feedstock to the distribution mechanism is at a low pressure (e.g., 1-15 psi). For example, step 7 may include delivery with a low pressure delivery mechanism such as a fluid drilling machine that uses one or more fluid drilling augers may be used to deliver feedstock to a spray nozzle. By way of another example, step 7 may include delivery using a low pressure peristaltic pump may be used. However, the use of the peristaltic pump is not limiting, as delivery may take place using any positive displacement pump. In this regard, it is noted that many positive displacement pumps result excessive cavitation, detrimentally affecting the integrity of the pump or other components of a distribution or delivery mechanism. Therefore, in some embodiments, a pulse dampener is used to aid in delivery of the feedstock to a distribution mechanism.

Referring now to FIG. 16, an exemplary embodiment of a method 1600 for scrubbing and fertilizing according to the inventive concepts disclosed herein may include one or more of the following steps.

A step 1602 may include scrubbing process air flow using spray nozzles that deliver a feedstock (e.g., medium- to high-viscosity fluid, pulverized lime, lime slurry, etc.) using a low pressure. For example, the medium to high viscosity fluid may include a Menhaden fish oil, which is used in some liquid fertilizers. The fish oil may be delivered using one or more augers, or using a low pressure pump (e.g., peristaltic pump or positive displacement pump). It is noted that embodiments using a low pressure pump may also incorporate a fluid dampening apparatus. It is noted that the fish oil may include one or more emulsifiers such that the oil is delivered to the scrubber chamber and/or filter as an emulsion.

A step 1604 may include draining and/or collecting the reactant (e.g., medium to high viscosity fluid and one or more pollutants) from a scrubbing chamber and collecting the reactant. For example, a second set of nozzles (not shown in FIG. 12 or 13) may be provided to help spray water or some other medium to low viscosity fluid to help the draining of the medium to high viscosity fluid from the scrubbing chamber. In other embodiments, the second set of nozzles is optional. Upon draining the medium to high viscosity fluid from the scrubbing chamber, the medium to high viscosity fluid may be collected by a collector (e.g., storage tank). It is noted that the medium to high viscosity fluid collected will include pollutants removed from the process air. For example, the fluid collected may include PAH or other lipophilic pollutants.

A step 1606 may include distributing the collected medium (e.g., reactant and/or high viscosity fluid and pollutant(s)) to a fertilizing medium (e.g., soil, liquid fertilizer, bio slurry, biogas slurry, etc.). For example, soil may be in a field or may be processed to be used as fertilizer for a specific type of plant. For instance, certain plants, including but not limited to, lettuce, rye, radishes, tobacco, corn, maize, wheat, ryegrass, cucumbers, soybeans, and carrots, have been found to catabolize or uptake certain lipophilic pollutants (e.g., PAH including benzo(a)pyrene (BAP)). Thus, the collected fluids may be mixed with soil or other ingredients intended to be used as a fertilizer for these certain types of plants. It is noted that some ingredients (e.g., cytochrome P450 enzymes, epoxide hydrolase such as soybean epoxide hydrolase, or combinations thereof) may be used (e.g., in feedstock material, or as additive to soil/fertilizer) to help with plant uptake of pollutants.

In some embodiments, method 1600 may include one or more additional, optional steps. For example, step 1608 may include applying the collected fluids to a soil or to fertilizer that is intended only for a dedicated process (e.g., production of ethanol using corn or maize, production of combusting fuel sources such as cellulose mass, animal feed production, etc.). By way of another example, a step 1610 may include harvesting the plant and using the plant to which the collected fluids were applied in an ethanol and/or animal feed production process. For instance, the plants, including grain and/or feedstocks, may be ground/milled, cooked, sent through a liquefaction process, fermented, distilled, centrifuged, separated (e.g., evaporation, condensed, etc.), dried (e.g., to produce grains and/or solids for animal feed or wet distillers grains), sieved, denatured, stored, shipped, and blended with gasoline.

In some embodiments, scrubbers may again be utilized to remove pollutants from a second stage production process. In this regard, the second stage production process may be a second scrubbing process that is scrubbing by-product from a first recycle loop, resulting from a first scrubbing process. In this regard, a concentration of the pollutant may increase as the scrubbing process is iteratively used on first, second, and third by-products (e.g., output) to remove pollutants. Thus, in some embodiments, an end dedicated process may be used to remove or convert super concentrated pollutants to a usable form. For example, a vortex incineration process may be used. By way of another example, an industrial solid waste site may be utilized.

Figure 17:
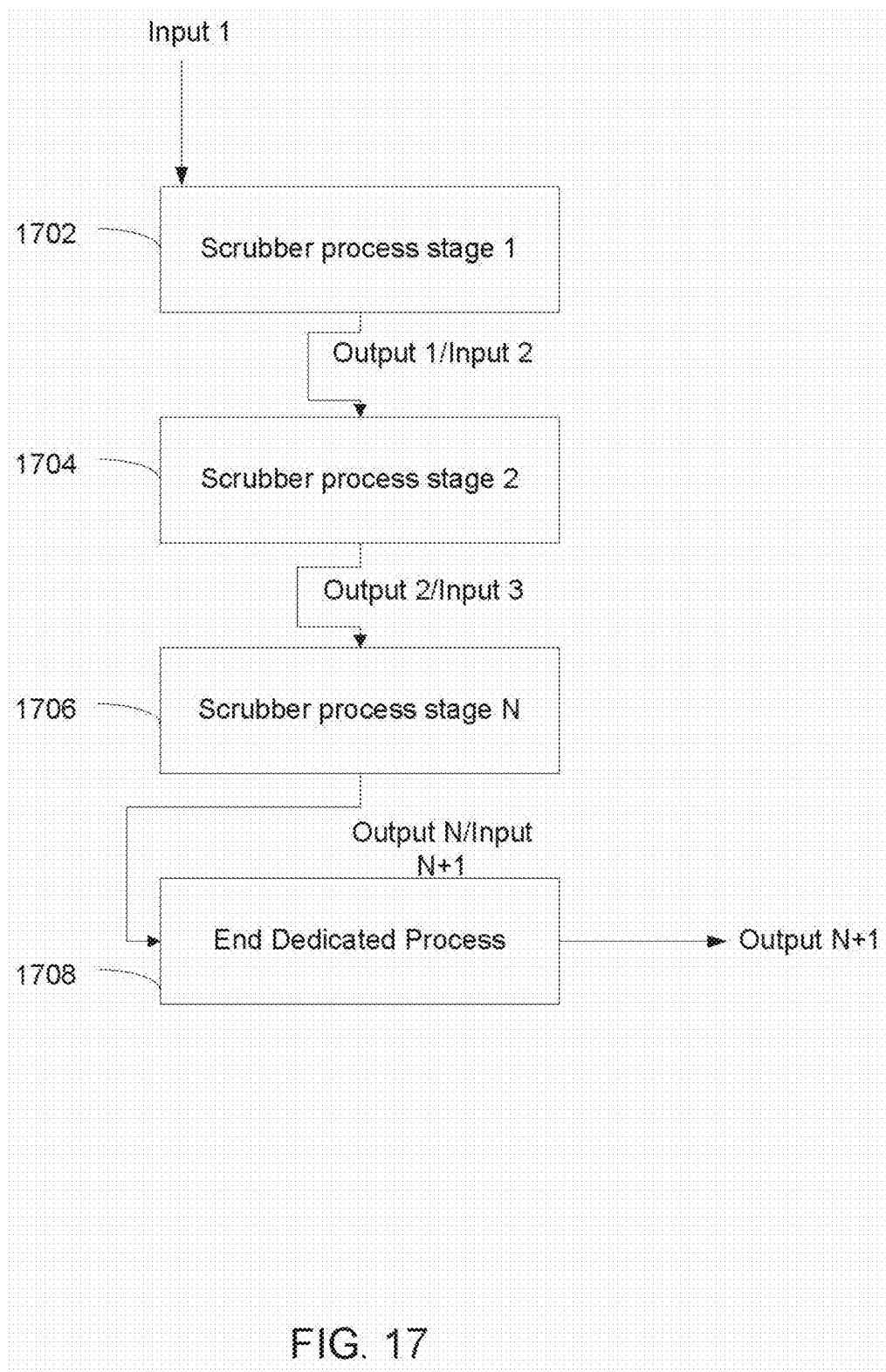
FIG. 17 shows a flow diagram of method for recycling by-product from a stage in one or more subsequent stages, in accordance with one or more embodiments of the present disclosure.

Referring now to FIG. 17, a method where the recycle or subsequent use of by-product from a stage in one or more subsequent stages is depicted as one or more steps.

For example, step 1702 may include receiving a first input. The first input may include an air stream or an exhaust from an industrial (e.g., combustion) process. A wet or dry scrubber as disclosed herein may be used to remove one or more pollutants from the air stream/exhaust to generate a first output (e.g., Output 1). This first output may be used in a dedicated process (e.g., fertilization of plants to be used in ethanol or other industrial or combustion process). The dedicated process may create a second air stream/exhaust. This second air stream/exhaust may be used as Input 2 for the step 1704. This recycle of byproduct from one or more scrubber processes (e.g., N scrubber process stages 1706) may result in one or more outputs with increasingly concentrated pollutant concentrations. Thus, an end dedicated process 1708 may be utilized in order to remove or convert a highly concentrated output (e.g., Output N) or a highly concentrated pollutant input (e.g., Input N+1) to generate a useable or substantially clean output (e.g., Output N+1). For example, the end dedicated process may include a vortex incineration process. It is noted that one or all of the stages indicated in this method may utilize a delivery and/or a distribution mechanism according to the inventive concepts disclosed herein.

In embodiments, the distribution mechanism may vary or is adjustable based on the dedicated process for which it is being used. For example, a first dedicated process that includes a subsequent scrubbing stage, such as in a cascading separation process, may utilize a different fixture including a different nozzle and/or outlet than a second dedicated process. The second dedicated process may include a fertilization process. For instance, a by-product from a first dedicated process that includes a scrubbing stage may result an oil/emulsion by-product with one or more pollutants that may be used to create a soil amendment or a soil conditioner. By way of another example, a nozzle of a distribution mechanism used in a third dedicated process including a vortex incineration process may be different than the nozzle of a distribution mechanism used for a previous scrubbing stage. Similarly, the delivery mechanism may also vary depending on the dedicated process for which it is being used. It is noted that flow rates, orifice sizes of nozzles, viscosities, temperatures, and other properties of fixtures and/or feedstock may be adjustable based on the dedicated process.

It is further noted that for purposes of determining flow rates, or a mechanical energy balance, in some embodiments a working form of Bernoulli's equation (BE) may be used as follow:

$$\Delta\left(\frac{P}{\rho} + gz + \frac{V^2}{2}\right) = \frac{DW_{n.f.}}{dm} - \bar{F}$$

In other embodiments, a head form of BE may be used as follows:

$$\Delta\left(\frac{P}{\rho g} + z + \frac{V^2}{2g}\right) = \frac{DW_{n.f.}}{g\,dm} - \bar{F}/g$$

It is noted that when a mass balance is performed for a sudden expansion, the following relationship may be applicable:

$$V_2 = \frac{V_2^2 - V_1^2}{2}$$

Figure 18:
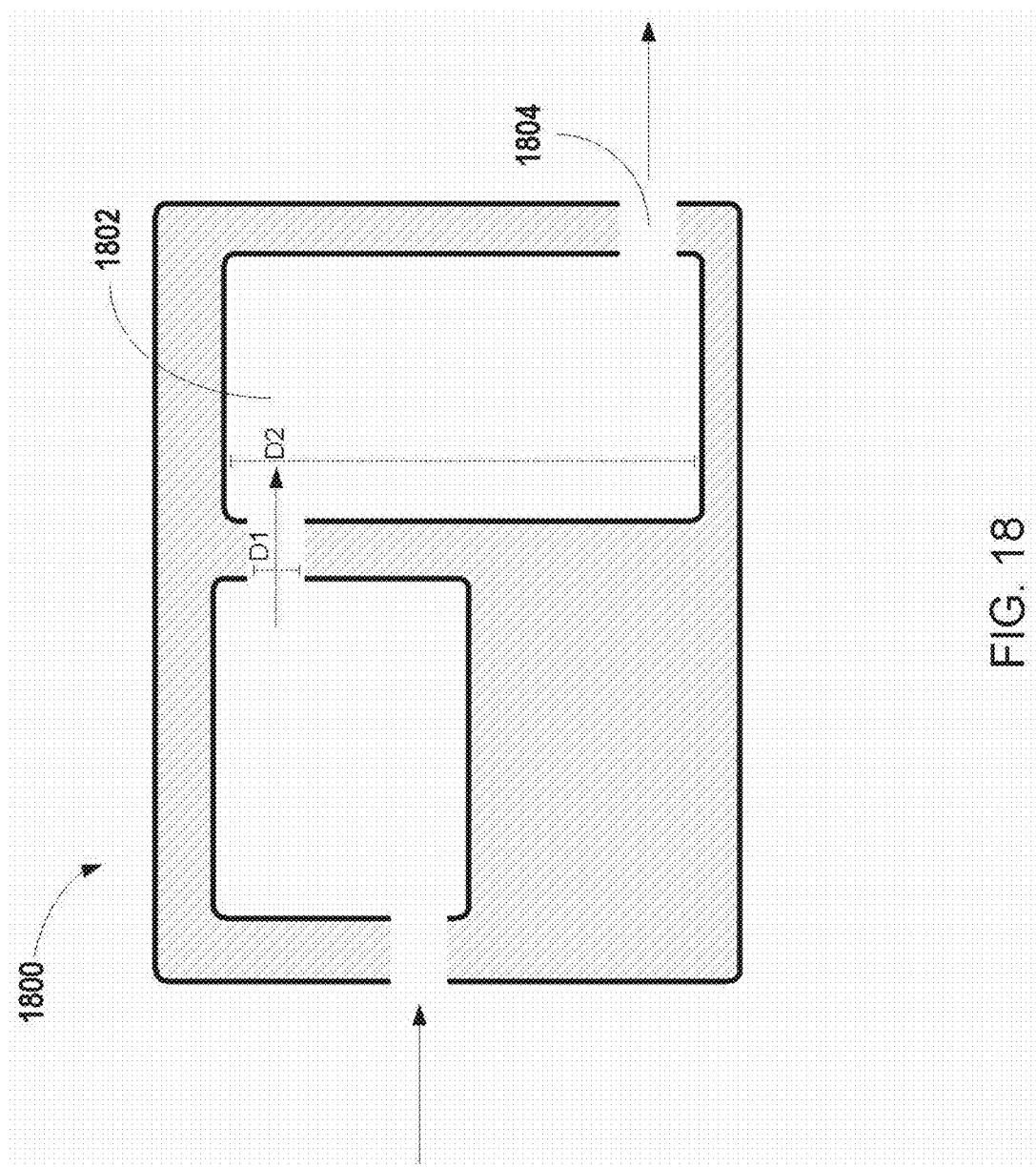
FIG. 18 shows a schematic of a pulse dampener, in accordance with one or more embodiments of the present disclosure.

Referring now to FIG. 18, a sectional view of an embodiment of a pulse dampener 1800 is depicted. Pulse dampener 1800 may include one or more cavities 1802 and one or more channels 1804. In some embodiments, the pulse dampener 1800 includes multiple channels successively coupled using multiple channels 1804. In this regard, flow from the positive displacement pump may enter a first channel 1804 and exit a last channel 1804, where one or more channels 1804 may be between the fist and the last channel 1804. It is further noted that although channels 1804 are depicted as having parallel sides, this depiction is not limiting. For example, in some embodiments, the channels 1804 may have contracting sides or expanding sides (e.g., sides configured to contract or expand fluid flowing through them).

In some embodiments, the methods disclosed herein may include using a formula, model, or relationship to predict flow characteristics. For example, Bernoulli's Equation may be used to understand and predict flow characteristics into, through, and out of the pulse dampener 1800, according to the following:

$$\Delta\left(\frac{P}{\rho} + gz + \frac{V^2}{2}\right) = \frac{dW_{n.f.}}{dm} - \bar{F}$$

where $\bar{F}$ is the friction heating term per unit mass. In embodiments, the friction heating term may be proportional to diameter of the channel 1804 and diameter (e.g., or height) of chamber 1802 according to the following:

$$\bar{F} = K\frac{V^2}{2}$$

where K is the resistance coefficient, V is the largest of the two velocities. In embodiments incorporating a sudden expansion or enlargement K may be related to the two pipe diameters (e.g., entrance pipe and chamber pipe, or height of chamber) according to the following:

$$K = \left[1 - \frac{D_1^2}{D_2^2}\right]^2$$

For example, flow entering channel 1804 from a positive displacement pump may flow into a first cavity 1802 where it encounters a large mass of fluid within the cavity 1802. This encounter of flow with a large mass results a number of random/chaotic eddies. Not only do these eddies help to transfer kinetic-pulsating energy resulting from the pump, but they also help enable further mixing, which may contribute to emulsion formation. Using Bernoulli's Equation and a point near the fluid entrance and a point far from the fluid entrance, where velocity is negligible, a relationship of fluid flow characteristics is determined according to the following:

$$P_2 - P_1 = \frac{\rho V_1^2}{2} - \rho \bar{F}$$

The above equation assumes that the potential energy term is negligible. As this is not always the case in pulse dampener 1800, other forms of Bernoulli's equation may be derived. Further, as the channels may gradually contract or expand, instead of using sudden contraction and/or expansion, the forms Bernoulli's equation may take may again vary.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An apparatus for scrubbing, comprising:
   a process gas inlet;
   an exhaust outlet;
   an applicator comprising:
   one or more delivery mechanisms for delivering a scrubbing agent, wherein the one or more delivery mechanism are each configured as a positive displacement pump, wherein the positive displacement pump comprises one or more augers configured to deliver the scrubbing agent; and
   one or more distribution mechanisms configured as a spray fixture for receiving the scrubbing agent and a kinetic energy fluid pressurized between zero psi and ten psi, wherein a flow of the kinetic energy fluid over a film of the scrubbing agent within the spray fixture forms droplets containing the scrubbing agent, wherein the kinetic energy fluid flows along a single flow path;

a recycle loop configured to recycle one or more products from the exhaust outlet through the process gas inlet; and a collector for collecting the scrubbing agent in combination with a pollutant removed from a process gas.

2. The apparatus of claim 1, wherein the scrubbing agent includes at least one of a medium viscosity fluid or a high viscosity fluid.

3. The apparatus of claim 2, wherein the at least one of the medium or the high viscosity fluid includes a fish oil.

4. The apparatus of claim 1, wherein at least one of the process gas inlet or the exhaust outlet comprises a plurality of vents.

5. The apparatus of claim 4, wherein at least one of the plurality of vents is configured to restrict fluid flow in at least one direction and to allow fluid flow in at least a second direction.

6. The apparatus of claim 1, wherein the spray fixture comprises a plurality of nozzles.

7. The apparatus of claim 2, wherein the medium viscosity fluid comprises a fluid having a viscosity from 0.86×10-3 to 0.08 kg/m·s (0.86 to 80 cP).

8. The apparatus of claim 2, wherein the high viscosity fluid comprises a fluid having a viscosity from 0.8 to 5 kg/m·s (800 to 5000 cP).

9. An apparatus for scrubbing, comprising:

a process gas inlet;

an exhaust outlet or a vent;

an applicator comprising:

one or more delivery mechanisms for delivering a wet scrubbing agent or a dry scrubbing agent, wherein the one or more delivery mechanisms are each configured as a positive displacement pump and are each configured to deliver the wet scrubbing agent and the dry scrubbing agent; and one or more distribution mechanisms each configured as a spray fixture for receiving the wet scrubbing agent or the dry scrubbing agent and a kinetic energy fluid pressurized between zero psi and ten psi, wherein the kinetic energy fluid flows along a single flow path, the spray fixture being configured for applying the wet scrubbing agent or the dry scrubbing agent, the dry scrubbing agent including a pulverized or powderized agent and the wet scrubbing agent including at least one of a medium viscosity fluid or a high viscosity fluid;

a recycle loop configured to recycle one or more products from the exhaust outlet through the process gas inlet; and a collector configured to collect a reactant including the wet scrubbing agent or the dry scrubbing agent and a pollutant.

10. The apparatus of claim 9, wherein the dry scrubbing agent includes limestone and the wet scrubbing agent includes fish oil.

11. The apparatus of claim 9, wherein the one or more distribution mechanisms are each configured to distribute and adjust distribution of the wet scrubbing agent or the dry scrubbing agent based on properties of a feedstock including the wet scrubbing agent or the dry scrubbing agent.

12. The apparatus of claim 11, wherein the positive displacement pump comprises one or more augers configured to deliver and adjust delivery of the wet scrubbing agent or the dry scrubbing agent based on the properties of the feedstock and based on one or more properties of the kinetic energy fluid.

13. The apparatus of claim 9, wherein at least one of the process gas inlet or the exhaust outlet comprise a plurality of vents.

14. The apparatus of claim 13, wherein at least one of the plurality of vents is configured to restrict fluid flow in at least one direction and to allow fluid flow in at least a second direction.

15. The apparatus of claim 9, wherein the positive displacement pump comprises one or more augers configured to deliver the wet scrubbing agent or the dry scrubbing agent.

16. The apparatus of claim 15, wherein the spray fixture comprises a plurality of nozzles.

17. The apparatus of claim 9, wherein the medium viscosity fluid comprises a fluid having a viscosity from $0.86 \times 10$-3 to 0.08 kg/m·s (0.86 to 80 cP).

18. The apparatus of claim 9, wherein the high viscosity fluid comprises a fluid having a viscosity from 0.8 to 5 kg/m·s (800 to 5000 cP).

19. The apparatus of claim 9, wherein the kinetic energy fluid includes a lipophilic pollutant or lipophilic particulate.

* * * * *